United States Patent
Choi et al.

(10) Patent No.: US 11,949,095 B2
(45) Date of Patent: Apr. 2, 2024

(54) COMPOSITE SOLID ELECTROLYTE, ELECTROCHEMICAL CELL INCLUDING THE SAME, AND METHOD OF PREPARING THE COMPOSITE SOLID ELECTROLYTE

(71) Applicant: Samsung Electronics Co., Ltd., Suwon-si (KR)

(72) Inventors: Wonsung Choi, Hwaseong-si (KR); Dongjoon Lee, Suwon-si (KR); Hyunpyo Lee, Seoul (KR); Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 284 days.

(21) Appl. No.: 17/036,368

(22) Filed: Sep. 29, 2020

(65) Prior Publication Data
US 2021/0184201 A1    Jun. 17, 2021

(30) Foreign Application Priority Data
Dec. 16, 2019  (KR) ........................ 10-2019-0168143

(51) Int. Cl.
*H01M 4/134*        (2010.01)
*H01M 4/04*         (2006.01)
*H01M 4/1391*       (2010.01)
*H01M 4/1395*       (2010.01)
*H01M 10/0525*      (2010.01)

(52) U.S. Cl.
CPC ....... *H01M 4/1395* (2013.01); *H01M 4/0404* (2013.01); *H01M 4/0471* (2013.01); *H01M 4/134* (2013.01); *H01M 4/1391* (2013.01); *H01M 10/0525* (2013.01); *H01M 2300/0037* (2013.01); *H01M 2300/0071* (2013.01); *H01M 2300/0094* (2013.01)

(58) Field of Classification Search
CPC ..... H01M 10/0525; H01M 2300/0071; H01M 2300/0094; H01M 10/0562
See application file for complete search history.

(56) References Cited

U.S. PATENT DOCUMENTS

| | | |
|---|---|---|
| 9,561,579 B1 | 2/2017 | Baek et al. |
| 9,966,628 B2 | 5/2018 | Schilm et al. |
| 10,090,557 B2 | 10/2018 | Trevey et al. |
| 10,312,540 B2 | 6/2019 | Haydn et al. |
| 2007/0231704 A1 | 10/2007 | Inda |
| 2008/0070087 A1 | 3/2008 | Johnson |

(Continued)

FOREIGN PATENT DOCUMENTS

| | | |
|---|---|---|
| JP | 5751589 B2 | 5/2015 |
| KR | 10-1452950 B1 | 10/2014 |

(Continued)

*Primary Examiner* — Stewart A Fraser
(74) *Attorney, Agent, or Firm* — CANTOR COLBURN LLP

(57) ABSTRACT

A composite solid electrolyte includes: a solid electrolyte; and a protective layer on a surface of the solid electrolyte, wherein the protective layer comprises a compound of Formula 1

$$Li_xM1_yM2_zO_{t+x/2}$$    Formula 1 wherein in Formula 1,
M1 is an element having a Gibbs reaction energy of greater than 0 electron-volts per mole,
M2 is an element of Groups 2 to 14,
$0<x<1$, $0<y<1$, $0\leq z<1$, and $0<t\leq 1$.

37 Claims, 13 Drawing Sheets

(56) References Cited

U.S. PATENT DOCUMENTS

| | | | |
|---|---|---|---|
| 2010/0104948 A1 | 4/2010 | Skotheim et al. | |
| 2011/0129739 A1 | 6/2011 | Nakanishi | |
| 2012/0183834 A1* | 7/2012 | Kanda | H01M 50/449 |
| | | | 429/126 |
| 2012/0276459 A1 | 11/2012 | Im et al. | |
| 2013/0108934 A1 | 5/2013 | Lee et al. | |
| 2014/0356736 A1* | 12/2014 | Choi | H01M 4/48 |
| | | | 429/405 |
| 2016/0351943 A1 | 12/2016 | Albano et al. | |
| 2017/0012332 A1 | 1/2017 | Lee et al. | |
| 2017/0033422 A1 | 2/2017 | Kim et al. | |
| 2017/0222287 A1 | 8/2017 | Suzuki et al. | |
| 2017/0271684 A1 | 9/2017 | Jung et al. | |
| 2018/0040898 A1 | 2/2018 | Lee et al. | |
| 2018/0269526 A1* | 9/2018 | Takeuchi | H01M 10/052 |
| 2019/0088986 A1 | 3/2019 | Hu et al. | |
| 2020/0127353 A1 | 4/2020 | Lee et al. | |
| 2020/0343582 A1* | 10/2020 | Li | H01M 10/0525 |
| 2021/0126287 A1* | 4/2021 | Rogojina | H01M 12/08 |
| 2021/0399337 A1* | 12/2021 | Choi | H01M 10/0562 |

FOREIGN PATENT DOCUMENTS

| | | |
|---|---|---|
| KR | 1020150080376 A | 7/2015 |
| KR | 10-1844110 B1 | 5/2018 |
| KR | 1020180111552 A | 10/2018 |
| KR | 10-1935365 B1 | 12/2018 |
| KR | 10-1959761 B1 | 7/2019 |

* cited by examiner

COMPOSITE SOLID ELECTROLYTE, ELECTROCHEMICAL CELL INCLUDING THE SAME, AND METHOD OF PREPARING THE COMPOSITE SOLID ELECTROLYTE

CROSS-REFERENCE TO RELATED APPLICATION

This application claims priority to and the benefit of Korean Patent Application No. 10-2019-0168143, filed on Dec. 16, 2019, in the Korean Intellectual Property Office, and all the benefits accruing therefrom under 35 U.S.C. § 119, the content of which is incorporated herein in its entirety by reference.

BACKGROUND

1. Field

The present disclosure relates to a composite solid electrolyte, an electrochemical cell including the same, and methods of preparing the composite solid electrolyte.

2. Description of the Related Art

Electrochemical cells, e.g., lithium batteries, are manufactured using materials that allow for intercalation and deintercalation of lithium ions in the negative electrode and a positive electrode. A porous separator is disposed between the electrodes and a liquid electrolyte is injected therein.

The liquid electrolyte serves as an ion conductor in the electrodes. In a lithium metal battery that uses lithium metal as a negative electrode, there is a risk of fire or explosion due to high reactivity between the lithium metal, which can be formed as a thin film, and a liquid electrolyte, during charge and discharge. To prevent this risk, an electrochemically stable solid electrolyte has been used.

However, in an environment containing moisture, corrosion may occur at an interface between a positive electrode and a solid electrolyte of a lithium battery due to a basic product generated during discharge, and thus charge and discharge characteristics may deteriorate.

Therefore, there is a need to develop a more stable and safer material that provides suitable charge and discharge characteristics in which corrosion is prevented at an interface between a positive electrode and a solid electrolyte.

SUMMARY

Provided is a composite solid electrolyte having excellent charge and discharge characteristics that prevents corrosion at an interface between a positive electrode and a solid electrolyte by including a protective layer between the positive electrode and the solid electrode.

Provided is an electrochemical cell including the composite solid electrolyte.

Provided are methods of preparing the composite solid electrolyte.

Additional aspects will be set forth in part in the description which follows and, in part, will be apparent from the description.

According to an aspect, a composite solid electrolyte includes:
a solid electrolyte; and
a protective layer, wherein the protective layer is on a surface of the solid electrolyte and comprises a compound represented by Formula 1

$$Li_xM1_yM2_zO_{t+x/2}$$  Formula 1 wherein in Formula 1,
M1 is an element having a Gibbs reaction energy of greater than 0 electron-volts per mole;
M2 is an element of Groups 2 to 14,
$0<x<1$, $0<y<1$, $0 \leq z<1$, and $0<t \leq 1$.

According to an aspect, an electrochemical cell includes:
a negative electrode;
an electrolyte comprising a composite solid electrolyte; and
a positive electrode,
wherein the composite solid electrolyte includes a solid electrolyte, and a protective layer, wherein the protective layer is on a surface of the solid electrolyte and comprises a compound represented by Formula 1

$$Li_xM1_yM2_zO_{t+x/2}$$  Formula 1 wherein in Formula 1, M1 is an element having a Gibbs reaction energy of greater than 0 electron-volts per mole, M2 is an element of Groups 2 to 14, $0<x<1$, $0<y<1$, $0 \leq z<1$, and $0<t \leq 1$, and wherein the protective layer of the composite solid electrolyte is between the solid electrolyte and the positive electrode.

According to an aspect, a method of preparing a composite solid electrolyte includes:
providing a solid electrolyte;
disposing a first layer comprising a first element on the solid electrolyte, wherein the first element has a Gibbs reaction energy of greater than 0 electron-volts per mole;
heat-treating the first layer to oxidize the first element and form an oxide comprising the first element;
depositing a metal on the oxide to form a current collector;
contacting the oxide, the current collector, or a combination thereof with a liquid electrolyte comprising lithium; and
applying a voltage to reduce the oxide to form a compound represented by Formula 2 to form a protective layer on the solid electrolyte and prepare the composite solid electrolyte, $$Li_{x1}M'1_{y1}O_{t1+x1/2}$$  Formula 2 wherein in Formula 2,
M'1 is an element having a Gibbs reaction energy of greater than 0 electron-volts per mole,
$0<x1<1$, $0<y1<1$, and $0<t1 \leq 1$.

According to an aspect, a method of preparing a composite solid electrolyte includes:
providing a solid electrolyte;
disposing a first layer comprising a first element on the solid electrolyte, wherein the first element has a Gibbs reaction energy of greater than 0 electron-volts per mole;
disposing a second layer comprising a second element of Groups 2 to 14 on the solid electrolyte;
heat-treating the first layer and the second layer to form an oxide comprising the first element and the second element;
depositing a metal on the oxide to form a current collector;
contacting the oxide, the current collector, or a combination thereof with a liquid electrolyte comprising lithium; and applying a voltage to reduce the oxide to form a compound represented by Formula 3 to form a protective layer on the solid electrolyte and prepare the composite solid electrolyte, $$Li_{x2}M''1_{y2}M''2_{z2}O_{t2+x2/2} \quad \text{Formula 3}$$

wherein in Formula 3
M"1 is an element having a Gibbs reaction energy value of about 0 electron-volts per mole or greater,
M"2 is an element of Groups 2 to 14,
$0<x2<1$, $0<y2<1$, $0<z2<1$, and $0<t2\leq1$.

BRIEF DESCRIPTION OF THE DRAWINGS

The above and other aspects, features, and advantages of embodiments will be more apparent from the following description taken in conjunction with the accompanying drawings, in which.

DETAILED DESCRIPTION

Figure 1:
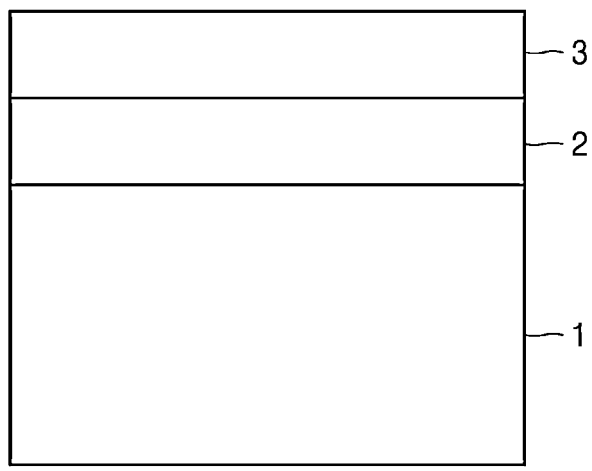
FIG. 1 is a schematic partial cross-sectional view of an embodiment of an electrochemical cell.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the disclosed embodiment is merely described below, by referring to the figures, to explain aspects. As used herein, the term "and/or" includes any and all combinations of one or more of the associated listed items. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section," discussed below could be termed a second element, component, region, layer, or section without departing from the teachings herein.

The terminology used herein is for the purpose of describing particular embodiments only and is not intended to be limiting. It will be further understood that the terms "comprises" and/or "comprising," or "includes" and/or "including," when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite solid electrolyte, an electrochemical cell including the same, and a method of preparing the composite solid electrolyte according to an embodiment will be described in further detail with reference to the accompanying drawings. The following description is provided for illustration purposes only and not for the purpose of limiting the present disclosure as defined by the appended claims.

As used herein, the term "combination" includes a mixture, an alloy, a reaction product, and the like unless otherwise stated.

Throughout the specification, the term "include" in relation to an element does not preclude other elements but may further include another element, unless otherwise stated. An expression used in the singular encompasses the expression of the plural, unless otherwise indicated or it has a clearly different meaning in the context. The term "or" refers to "and/or" unless otherwise stated. As used herein, the terms "an embodiment," "embodiments," and the like indicate that elements described with regard to an embodiment are included in at least one embodiment described in this specification and may or may not present in other embodiments. In addition, it may be understood that the described elements are combined in any suitable manner in various embodiments.

Unless otherwise defined, technical and scientific terms used herein have the same meaning as commonly understood by one or ordinary skill in the art to which this application belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

When a lithium-air battery is discharged in the presence of moisture, during discharge LiOH, which is basic, is generated, as shown in Reaction Scheme 1.

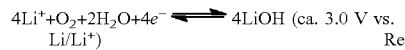
$4Li^+ + O_2 + 2H_2O + 4e^- \rightleftharpoons 4LiOH$ (ca. 3.0 V vs. Li/Li⁺)   Reaction Scheme 1

The basic LiOH reacts with a solid electrolyte to generate $PO_4^{3-}$ ions. As a result, the solid electrolyte is decomposed, which causes micrometer-scale cracks on the surface thereof.

For example, a $Li_{1.3}Al_{0.3}Ti_{1.7}(PO_4)_3$ (LATP) solid electrolyte having a NASICON-type crystal structure, i.e., a crystal structure that is isostructural with NASICON, may react with oxygen in the air and the basic LiOH to generate $AlPO_4$ as shown in Reaction Scheme 2. NASICON, or compounds that are isostructural with NASICON, are compounds of the formula $A_1Q_2(PO_4)_3$ where A is a monovalent cation and Q is either a single or combination of tri-, tetra-, or penta-valent ions.

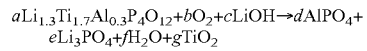
$aLi_{1.3}Ti_{1.7}Al_{0.3}P_4O_{12} + bO_2 + cLiOH \rightarrow dAlPO_4 + eLi_3PO_4 + fH_2O + gTiO_2$   Reaction Scheme 2

Thus, micrometer-scale cracks may be created on the surface of the LATP solid electrolyte.

In addition, $PO_4^{3-}$ ions are also generated from the solid electrolyte by electrochemical reduction. As a result, the solid electrolyte is decomposed to cause micrometer-scale cracks on the surface thereof. This may be confirmed by Reaction Scheme 3 of the LATP solid electrolyte having a NASICON-type crystal structure:

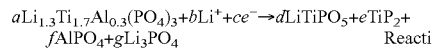
$aLi_{1.3}Ti_{1.7}Al_{0.3}(PO_4)_3 + bLi^+ + ce^- \rightarrow dLiTiPO_5 + eTiP_2 + fAlPO_4 + gLi_3PO_4$   Reaction Scheme 3

Disclosed is a composite solid electrolyte including a protective layer on a surface of a solid electrolyte, an electrochemical cell including the same, and a method of preparing the composite solid electrolyte.

Hereinafter, the composite solid electrolyte, the electrochemical cell including the same, and the method of preparing the composite solid electrolyte will be described in further detail.

Composite Solid Electrolyte

A composite solid electrolyte according to an embodiment comprises: a solid electrolyte; and a protective layer comprising a compound represented by Formula 1, wherein the protective layer is located on a surface of the solid electrolyte.

$Li_xM1_yM2_zO_{t+x/2}$   Formula 1

In Formula 1,
M1 is an element having a Gibbs reaction energy of greater than 0 electron-volts per mole (eV/mol),
M2 is an element of Groups 2 to 14,
0<x<1, 0<y<1, 0≤z<1, and 0<t≤1.

The protective layer may be disposed on the surface of the solid electrolyte, and may be in the form of a layer. Methods of disposing the protective layer on the surface of the solid electrolyte as a layer may include a deposition method, such as physical vapor deposition (PVD), chemical vapor deposition (CVD), or atomic layer deposition (ALD).

The protective layer may include a compound represented by Formula 1.

A lithium metal oxide represented by Formula 1 may be a unary to ternary lithium metal oxide.

In Formula 1, M1 may be an element having a Gibbs reaction energy (ΔGr) of greater than 0 eV/mol or more, e.g., 0 eV/mol to about 10 eV/mol, about 0.1 eV/mol to about 8 eV/mol, or about 0.3 eV/mol to about 5 eV/mol. The Gibbs reaction energy may be obtained by subtracting a standard Gibbs energy of the anhydride of M1 as a reactant and a standard Gibbs energy of water or water vapor from a standard Gibbs energy of the hydroxide of M1 as a product, when the hydroxide of M1 is produced via a reaction between the anhydride of M1 and water or water vapor.

In further detail, the Gibbs reaction energy may be obtained by subtracting a standard Gibbs energy ($\Delta G_f$ ($M1_{y1}O_{t1}$)) of an anhydride ($M1_{y1}O_{t1}$) of an oxide of M1 ($M1_{y1}O_{t1}$) as a reactant and a standard Gibbs energy ($\Delta G_f$ ($nH_2O$)) of water from a standard Gibbs energy ($\Delta G_f$ ($M1_{y1}H_{2n}O_{t1+n}$)) of a hydroxide ($M1_{y1}H_{2n}O_{t1+n}$) of the oxide of M1 as a product, when the hydroxide ($M1_{y1}H_{2n}O_{t1+n}$) is produced via a reaction between the anhydride ($M1_{y1}O_{t1}$) and water as shown in Reaction Scheme 4:

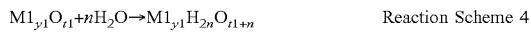

$$M1_{y1}O_{t1} + nH_2O \rightarrow M1_{y1}H_{2n}O_{t1+n} \quad \text{Reaction Scheme 4}$$

The reaction of the anhydride ($M1_{y1}O_{t1}$) of the oxide of M1 to the hydroxide ($M1_{y1}H_{2n}O_{t1+n}$) of the oxide of M1 is spontaneous, i.e., involuntary, in an electrochemical cell during charge and discharge in an environment containing moisture, and M1 may protect the surface of the composite solid electrolyte against corrosion under basic conditions. Thus, the composite solid electrolyte may provide an electrochemical cell having excellent charge and discharge characteristics, including excellent lifespan characteristics and high electrochemical stability.

M1 may comprise Pt, Eu, Hf, Zr, Ta, Ti, Ce, Nb, W, Mo, Co, Tl, Si, Sb, Ag, V, Sn, Sc, Ni, Mn, Fe, Be, Cu, Ge, Al, Au, C, Tm, Dy, Pb, or a combination thereof.

For example, M1 may be an element having a Gibbs reaction energy ($\Delta Gr$) of 0.3 eV/mol or more. As noted, the Gibbs reaction energy may be obtained by subtracting a standard Gibbs energy of the anhydride of M1 as a reactant and a standard Gibbs energy of water from a standard Gibbs energy of the hydroxide of M1 as a product, when the hydroxide of M1 is produced via a reaction between the anhydride of M1 and water.

For example, M1 may be Pt, Eu, Hf, Zr, Ta, Ti, Ce, Nb, W, or a combination thereof. For example, M1 may be Hf, Zr, Nb, or a combination thereof.

The composite solid electrolyte including M1 may be used to provide an electrochemical cell having excellent charge and discharge characteristics because the ionic conductivity of the composite solid electrolyte can be maintained to be similar to that of the solid electrolyte.

M2 is an element of Groups 2 to 14. For example, M2 may be an element of Groups 2 to 8 and Groups 10 to 14. For example, M2 may be Ti, V, Cr, Mn, Fe, Ni, Cu, Zn, Ga, Ge, Si, Al, W, Cd, Pd, Sn, Pb, Sc, Mg, Ca, Sr, Ba, or a combination thereof.

The protective layer may have a thickness of about 1 nanometer (nm) to about 200 micrometers (μm), e.g., about 1 nm to about 1 μm, about 10 nm to about 100 μm, about 100 nm to about 10 μm, or about 500 nm to about 5 μm. For example, the protective layer may have a thickness of 1 nm to 50 nm. When the thickness of the protective layer is within these ranges, an electrochemical cell having excellent charge and discharge characteristics with an ionic conductivity of at about 80% or more of that of the solid electrolyte.

The protective layer may include, for example, $Li_{0.67}Zr_{0.33}O$, $Li_{0.33}Nb_{0.33}O$, $Li_{0.08}Zr_{0.17}V_{0.25}O$, $Li_{0.08}Zr_{0.17}Ta_{0.25}O$, $Li_{0.83}Zr_{0.17}Zn_{0.25}O$, $Li_{0.83}Zr_{0.17}Mg_{0.25}O$, or a combination thereof.

The solid electrolyte may include a solid electrolyte having a NASICON-type crystal structure. For example, the solid electrolyte may include a solid electrolyte having a NASICON-type crystal structure including the elements Li, Ti, Al, P, and O. For example, the solid electrolyte may include $Li_{1+x}Ti_{2-x}Al(PO_4)_3$ (LTAP, where $0 \leq x \leq 4$), $Li_{1+x+y}Al_xTi_{2-x}Si_yP_{3-y}O_{12}$ (where $0 < x < 2$ and $0 \leq y < 3$), or a combination thereof. The solid electrolyte may have a high ionic conductivity of about $1 \times 10^{-2}$ Siemens per centimeter (S/cm) to about $1 \times 10^{-6}$ S/cm, about $5 \times 10^{-2}$ S/cm to about $5 \times 10^{-5}$ S/cm, or about $1 \times 10^{-3}$ S/cm to about $1 \times 10^{-4}$ S/cm, at room temperature.

The solid electrolyte may further include an inorganic solid electrolyte such as $Li_2S-P_2S_5$, $Li_2S-P_2S_5-LiX$ (where X is a halogen), $Li_2S-P_2S_5-Li_2O$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (where m and n are positive numbers, respectively, and Z is Ge, Zn or Ga), $Li_2S-GeS_2$, $Li_2S-SiS_2-Li_3PO_4$, $Li_2S-SiS_2-Li_pMO_q$ (where p and q are positive numbers, respectively, and M is P, Si, Ge, B, Al, Ga or In), $Li_xM'_yPS_zA_w$ (where x, y, z, and w are from 0 to 6, respectively, M' is Ge, Sn, or Si, and A is F, Cl, Br, or I), $BaTiO_3$, $Pb(Zr_aTi_{1-a})O_3$ where $0 \leq a \leq 1$ (PZT), $Pb_{1-x}La_xZr_{1-y}Ti_yO_3$ (PLZT, where $0 \leq x < 1$ and $0 \leq y < 1$), $Pb(Mg_3Nb_{2/3})O_3-PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, lithium phosphate ($Li_3PO_4$), lithium titanium phosphate ($Li_xTi_y(PO_4)_3$ where $0 < x < 2$ and $0 < y < 3$), lithium aluminum titanium phosphate ($Li_xAl_yTi_z(PO_4)_3$ where $0 < x < 2$, $0 < y < 1$, and $0 < z < 3$), $Li_{1+x+y}(Al_aGa_{1-a})_x(Ti_bGe_{1-b})_{2-x}Si_yP_{3-y}O_{12}$ (where $0 \leq x \leq 1$, $0 \leq y \leq 1$, $0 \leq a \leq 1$, and $0 \leq b \leq 1$), lithium lanthanum titanate ($Li_xLa_yTiO_3$ where $0 < x < 2$ and $0 < y < 3$), $Li_2O$, $LiAlO_2$, $Li_2O-Al_2O_3-SiO_2-P_2O_5-TiO_2-GeO_2$-based ceramics, Garnet-based ceramics ($Li_{3+x}La_3M_2O_{12}$ (where M=Te, Nb, or Zr), or a combination thereof, in addition to the solid electrolyte having a NASICON type crystal structure.

The solid electrolyte may further include an organic solid electrolyte. Examples of the organic solid electrolyte may include polyethylene derivatives, polyethylene oxide derivatives, polypropylene oxide derivatives phosphoric acid ester polymers, poly agitation lysine, polyester sulfide, polyvinyl alcohol, polyvinylidene fluoride, and polymers containing ionic dissociation groups.

The solid electrolyte may further include an amorphous solid electrolyte. The solid electrolyte may include a mixed solid electrolyte comprising a combination of a crystalline solid electrolyte and an amorphous solid electrolyte.

The solid electrolyte may further include a binder. The binder included in the solid electrolyte may be styrene butadiene rubber (SBR), polytetrafluoroethylene, polyvinylidene fluoride, polyethylene, polymethacrylate, polyacrylic acid, or a combination thereof.

The solid electrolyte may further include a lithium salt and/or an ionic liquid.

The solid electrolyte may have a thickness of about 1 micrometer (μm) to about 1,000 μm. For example, the solid electrolyte may have a thickness of about 5 μm to about 800 μm, about 7 μm to about 600 μm, about 10 μm to about 400 μm, or about 10 μm to about 300 μm.

The solid electrolyte may be formed as a single layer or as multiple layers.

The composite solid electrolyte may have an ionic conductivity of about 80% or more of an ionic conductivity of a solid electrolyte without a protective layer, at 20° C. For example, the composite solid electrolyte may have an ionic conductivity of about 82% or more, or about 84% or more of the ionic conductivity of the solid electrolyte without a protective layer, at about 20° C. In an aspect, the composite solid electrolyte may have an ionic conductivity of about 80% to about 99%, about 82% to about 98%, about 85% to about 96%, or about 90% to about 95%, of the solid electrolyte without a protective layer, at about 20° C.

Electrochemical Cell

An electrochemical cell according to an embodiment may be a battery, a super capacitor, or a fuel cell. The battery may be a lithium battery. The battery may include a lithium metal battery, a lithium-air battery, or a lithium-sulfur battery. For example, the battery may be a lithium-air battery.

The electrochemical cell according to an embodiment may comprise: a negative electrode; an electrolyte including the composite solid electrolyte; and a positive electrode.

FIG. 1 is a schematic partial cross-sectional view of an embodiment of an electrochemical cell.

As shown in FIG. 1, a protective layer 2 may be located on a solid electrolyte 1 of the composite solid electrolyte to face a positive electrode 3.

Because the protective layer 2 of the composite solid electrolyte prevents corrosion at the interface between the positive electrode 3 and the solid electrolyte 1, an electrochemical cell having excellent charge and discharge characteristics may be provided.

The negative electrode may include lithium metal or a lithium alloy. The negative electrode may include the lithium metal or a lithium alloy on a negative current collector.

The negative current collector may comprise a material which does not react with lithium metal, e.g., does not form an alloy or a compound with the lithium metal. The material used to form the negative current collector may be, for example, copper (Cu), stainless steel, titanium (Ti), iron (Fe), cobalt (Co), nickel (Ni), or a combination thereof. The negative current collector may be formed of an alloy or a coating material of the foregoing metals. The negative current collector may be in the form of a plate, a fiber, a tube, or a foil.

The lithium alloy may include a metal or a metalloid alloyable with lithium metal, or an oxide thereof. The metal or metalloid alloyable with lithium metal, or the oxide thereof, may be Si, Sn, Al, Ge, Pb, Bi, Sb, an Si—Y' alloy (where Y' is an alkali metal, an alkaline earth metal, a Group 13 element, a Group 14 element, a transition metal, a rare earth element, or a combination thereof (except for Si)), an Sn—Y' alloy (where Y' is an alkali metal, an alkaline earth metal, an element of Groups 13 to 16, a transition metal, a rare earth element, or a combination thereof (except for Sn)), $MnO_x$ (where $0<x≤2$), or the like. The alkali metal may be lithium (Li), sodium (Na), potassium (K), rubidium (Rb), cesium (Cs), or francium (Fr). The alkaline earth metal may be beryllium (Be), magnesium (Mg), calcium (Ca), strontium (Sr), barium (Ba), or radium (Ra). The transition metal may be scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh) palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), mercury (Hg), actinium (Ac), rutherfordium (Rf), dubnium (Db), seaborgium (Sg), bohrium (Bh), hassium (Hs), meitnerium (Mt), darmstadtium (Ds), roentgenium (Rg), or copernicium (Cn). The rare earth element may be cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y).

The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. For example, the oxide of the metal or metalloid alloyable with lithium may be lithium titanium oxide, vanadium oxide, lithium vanadium oxide, $SnO_2$, or $SiO_x$ (where $0<x<2$).

The negative electrode may further include a protective film on the surface of the lithium metal or lithium metal alloy. The protective film may be, for example, a solid-type protective film. The thickness of the negative electrode layer may be about 100 μm or less, for example, about 80 μm or less, or about 50 μm or less, or about 30 μm or less, e.g., about 1 μm to about 100 μm, about 5 μm to about 50 μm, or about 10 μm to about 25 μm.

The composite solid electrolyte may be crack-free at an interface with the positive electrode in the presence of LiOH, which is basic and is generated during discharge. The composite solid electrolyte may be crack-free at the interface with the positive electrode at an operating voltage between about 2 V vs Li/Li$^+$ to about 4.5 V vs Li/Li$^+$.

Because the shape of the protective layer of the composite solid electrolyte is maintained without cracks, even in the presence of LiOH, which is generated during discharge in an environment containing moisture, an electrochemical cell having excellent charge and discharge characteristics may be provided.

The positive electrode may be located, for example, on a positive current collector. The positive current collector may be in the form of plate, mesh, fiber, or foil, and may comprise indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. A combination comprising at least one of the foregoing may be used. The positive current collector may be omitted, if desired.

The positive electrode may be configured to use oxygen or water as a positive active material.

The positive electrode may further include a conductive material. The conductive material may be, for example, porous. Because the conductive material is porous, air easily permeates the conductive material. The conductive material may be any suitable porous and/or conductive material available in the art, e.g., a porous carbonaceous material. The carbonaceous material may be, for example, carbon black, graphite, graphene, activated carbon, and carbon fiber, but is not limited thereto, and any suitable carbonaceous material may also be used. The conductive material may be, for example, a metallic material. The metallic material may be, for example, a metal fiber, a metal mesh, or a metal powder. For example, metallic material may comprise copper, silver, nickel, aluminum, or a combination thereof. The conductive material may be, for example, an organic conductive material. The organic conductive material may be, for example, a polyphenylene derivative or a polythiophene derivative. The conductive material may be used alone or in a mixture. The positive electrode may further include a composite conductor as a conductive material.

For example, the positive electrode may further include an oxidizing/reducing catalyst of oxygen. The catalyst may include a noble metal catalyst such as platinum (Pt), gold (Au), silver (Ag), palladium (Pd), lanthanum (La), ruthenium (Ru), rhodium (Rh), or osmium (Os), an oxide catalyst such as manganese oxide, iron oxide, cobalt oxide, nickel oxide, or lanthanum ruthenium oxide, or an organometallic catalyst such as cobalt phthalocyanine, but is not limited thereto, and any other suitable oxidizing/reducing catalyst of oxygen may also be used. A combination comprising at least one of the foregoing may be used.

The catalyst may be on a support. Examples of the support include an oxide support, a zeolite support, a clay-based mineral support, and a carbon support. The oxide support may be a metal oxide support including Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide support may include, for example, alumina, silica, zirconium oxide, or titanium dioxide. The carbon support may be carbon black, for example ketjen black, acetylene black, channel black, or lamp black, graphite such as natural graphite, artificial graphite, expanded graphite, activated carbon, or carbon fiber, but is not limited thereto, and any suitable support may be used. A combination comprising at least one of the foregoing may be used.

The positive electrode may further include a binder. The binder may include a thermoplastic resin or a thermosetting resin. Examples of the binder may include polyethylene, polypropylene, polytetrafluorethylene (PTFE), polyvinylidene difluoride (PVDF), styrene-butadiene rubber, a tetrafluoroethylene-perfluoroalkyl vinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, or an ethylene-acrylic acid copolymer, each of which may be used alone or in combination with each other, but are not limited thereto. Any suitable binder material may be used.

To form the positive electrode, a positive electrode slurry may be prepared by mixing a conductive material, an oxygen oxidizing/reducing catalyst, and a binder, and adding a solvent to the mixture. The positive electrode slurry may be coated on a surface of a substrate and dried or press-molded on the substrate to increase density of the electrode. The substrate may be, for example, a positive current collector, a separator, or a solid electrolyte film. The positive current collector may be, for example, a gas diffusion layer. The binder may be omitted in the positive electrode.

The electrolyte may further include a liquid electrolyte, a gel electrolyte, a polymeric ionic liquid, or a combination thereof.

The liquid electrolyte may include a lithium salt including LiSCN, LiN(CN)$_2$, Li(CF$_3$SO$_2$)$_3$C, LiC$_4$F$_9$SO$_3$, LiN(SO$_2$CF$_2$CF$_3$)$_2$, LiCl, LiF, LiBr, LiI, LiB(C$_2$O$_4$)$_2$, LiBF$_4$, LiBF$_3$(C$_2$F$_5$), lithium bis(oxalato) borate (LiBOB), lithium oxalyldifluoroborate (LIODFB), lithium difluoro(oxalato) borate (LiDFOB), lithium bis(trifluoro methanesulfonyl) imide (LiTFSI, LiN(SO$_2$CF$_3$)$_2$), lithium bis(fluorosulfonyl) imide (LiFSI, LiN(SO$_2$F)$_2$), LiCF$_3$SO$_3$, LiAsFe, LiSbFe, LiClO$_4$, or a combination thereof. For example, the lithium salt may be an imide-based lithium salt. Examples of the imide-based lithium salt may include lithium bis(trifluoro methanesulfonyl)imide (LiTFSI, LiN(SO$_2$CF$_3$)$_2$) and lithium bis(fluorosulfonyl)imide (LiFSI, LiN(SO$_2$F)$_2$). The lithium salt may maintain or improve ionic conductivity by appropriately maintaining chemical reactivity with an ionic liquid.

An amount of the lithium salt may be about 1 molar (M) or more. For example, the amount of the lithium salt may be from about 1 M to about 4 M. When the amount of the lithium salt is within this range, mobility of lithium ions may be increased in the composite solid electrolyte, thereby further improving ionic conductivity.

The liquid electrolyte may include an organic solvent, an ionic liquid, an oligomer, or a combination thereof.

Examples of the organic solvent may include an ether-based solvent, a carbonate-based solvent, an ester-based solvent, a ketone-based solvent, or a combination thereof. Examples of the organic solvent may include propylenecarbonate, ethylenecarbonate, fluoroethylene carbonate, vinylethylene carbonate, butylene carbonate, dimethyl carbonate, diethyl carbonate, methylethyl carbonate, methylpropyl carbonate, ethylpropyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxorane, 4-methyldioxorane, dimethylacetamide, dimethylsulfoxide, dioxane, 1,2-dimethoxyethane, sulforane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, having a number average molecular weight (Mn) of about 500), dimethyl ether, diethyl ether, dibutyl ether, dimethoxy ethane, or tetrahydrofuran, but are not limited thereto. Any suitable organic solvent may also be used.

For example, the ionic liquid (IL) may include i) at least one cation, which may be an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof, and ii) at least one anion which may be BF$_4^-$, PF$_6^-$, AsF$_6^-$, SbF$_6^-$, AlCl$_4^-$, HSO$_4^-$, ClO$_4^-$, CH$_3$SO$_3$—, CF$_3$CO$_2^-$, (CF$_3$SO$_2$)$_2$N$^-$, Cl$^-$, Br$^-$, I—, SO$_4^-$, CF$_3$SO$_3$—, (C$_2$F$_5$SO$_2$)$_2$N—, (C$_2$F$_5$SO$_2$)(CF$_3$SO$_2$)N—, NO$_3^-$, Al$_2$Cl$_7^-$, CH$_3$COO$^-$, (CF$_3$SO$_2$)$_3$C, (CF$_3$CF$_2$SO$_2$)$_2$N$^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, (O(CF$_3$)$_2$C$_2$(CF$_3$)$_2$O)$_2$PO$^-$, or a combination thereof.

For example, the gel electrolyte may be obtained by adding a low-molecular solvent to the solid electrolyte. The gel electrolyte may be obtained, for example, by additionally adding a low-molecular compound, such as a solvent and an oligomer, to the solid electrode.

For example, the polymer ionic liquid may further include the same ionic liquid described above. Examples of the polymer ionic liquid may include poly(diallyl dimethylammonium trifluoromethane sulfonylimide) (TFSI), poly(1-allyl-3-methylimidazolium trifluoromethane sulfonylimide), or poly((N-methyl-N-propylpiperidinium bis(trifluoromethanesulfonyl)imide).

For example, the polymer ionic liquid may include at least one ion-conductive repeating unit that may be an ether-based monomer, acrylic-based monomer, methacrylic-based monomer, siloxane-based monomer, or a combination thereof.

Examples of the polymer ionic liquid may include polyethyleneoxide (PEO), polyvinyl alcohol (PVA), polyvinyl pyrrolidone (PVP), polyvinyl sulfone, polypropylene oxide (PPO), polymethylmethacrylate, polyethylmethacrylate, polydimethylsiloxane, polyacrylic acid, polymethacrylic acid, polymethyl acrylate, polyethyl acrylate, poly2-ethylhexyl acrylate, polybutyl methacrylate, poly 2-ethylhexylmethacrylate, polydecyl acrylate, polyethylenevinylacetate, phosphate ester polymer, polyester sulfide, polyvinylidene fluoride (PVdF), or Li-substituted Nafion, but are not limited thereto. Other suitable polymer ionic liquids may also be used.

For example, the lithium-air battery may further include a separator between the positive electrode and the negative electrode. The separator may have any composition that may withstand a range of use of the lithium-air battery without limitation. Examples of the separator include a non-woven fabric of a polymer such as a polypropylene non-woven fabric or a polyphenylene sulfide non-woven fabric, a porous film of an olefin resin such as polyethylene and polypropylene, glass fiber, or a combination thereof.

The separator may have a structure impregnated with a solid polymer electrolyte or a liquid electrolyte. The separator impregnated with the solid polymer electrolyte may be prepared by, for example, disposing a solid polymer electrolyte film on one surface, or opposite surfaces, of the separator and simultaneously roll the solid polymer electrolyte film and the separator. The separator impregnated with the liquid electrolyte may be prepared by injecting the liquid electrolyte, which includes a lithium salt, into the separator.

The lithium-air battery is prepared by disposing a negative electrode on one surface of a case, disposing an electrolyte layer on the negative electrode, disposing a positive electrode on the electrolyte layer, disposing a porous positive current collector on the positive electrode, disposing a pressing member that allows air to reach an air electrode on the porous positive current collector, and pressing the stacked structure to form a cell. The case may comprise an upper portion in contact with the negative electrode, a lower portion in contact with the air electrode, and an insulating resin that may be disposed between the upper and lower portions to electrically insulate the positive electrode from the negative electrode.

The lithium-air battery may be used as either a primary battery or a secondary battery. The lithium-air battery may be in the form of a coin, a button, a sheet, a stack, a cylinder, a plane, or a horn, but the shape of the lithium-air battery is not limited thereto. The lithium-air battery may also be applied to medium- or large-sized batteries for electric vehicles.

Figure 3:
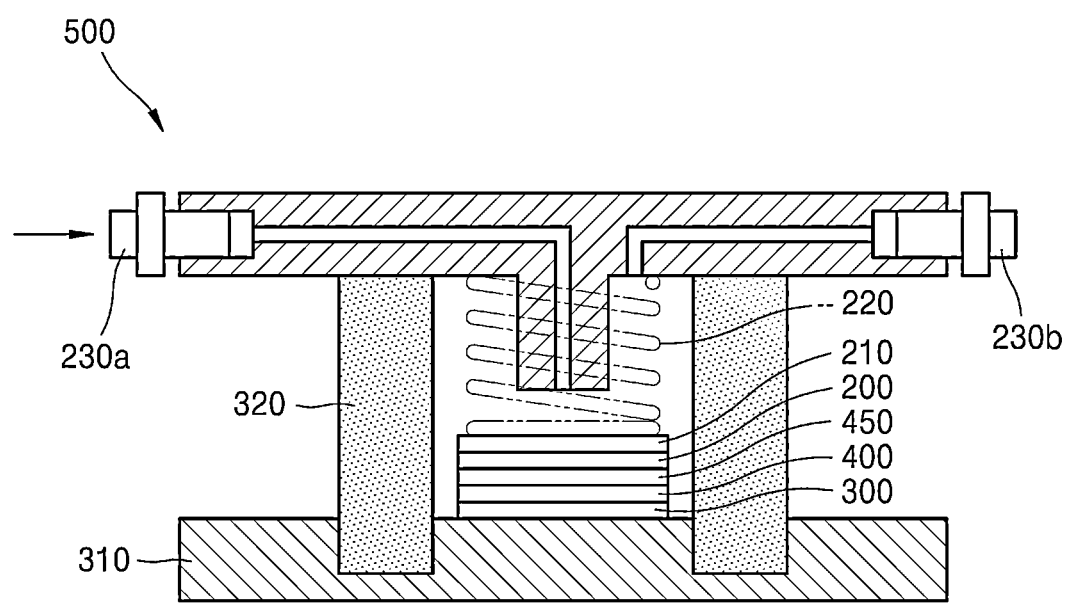
FIG. 3 is a schematic diagram illustrating an embodiment of a structure of a lithium-air battery.
Figure 4A:
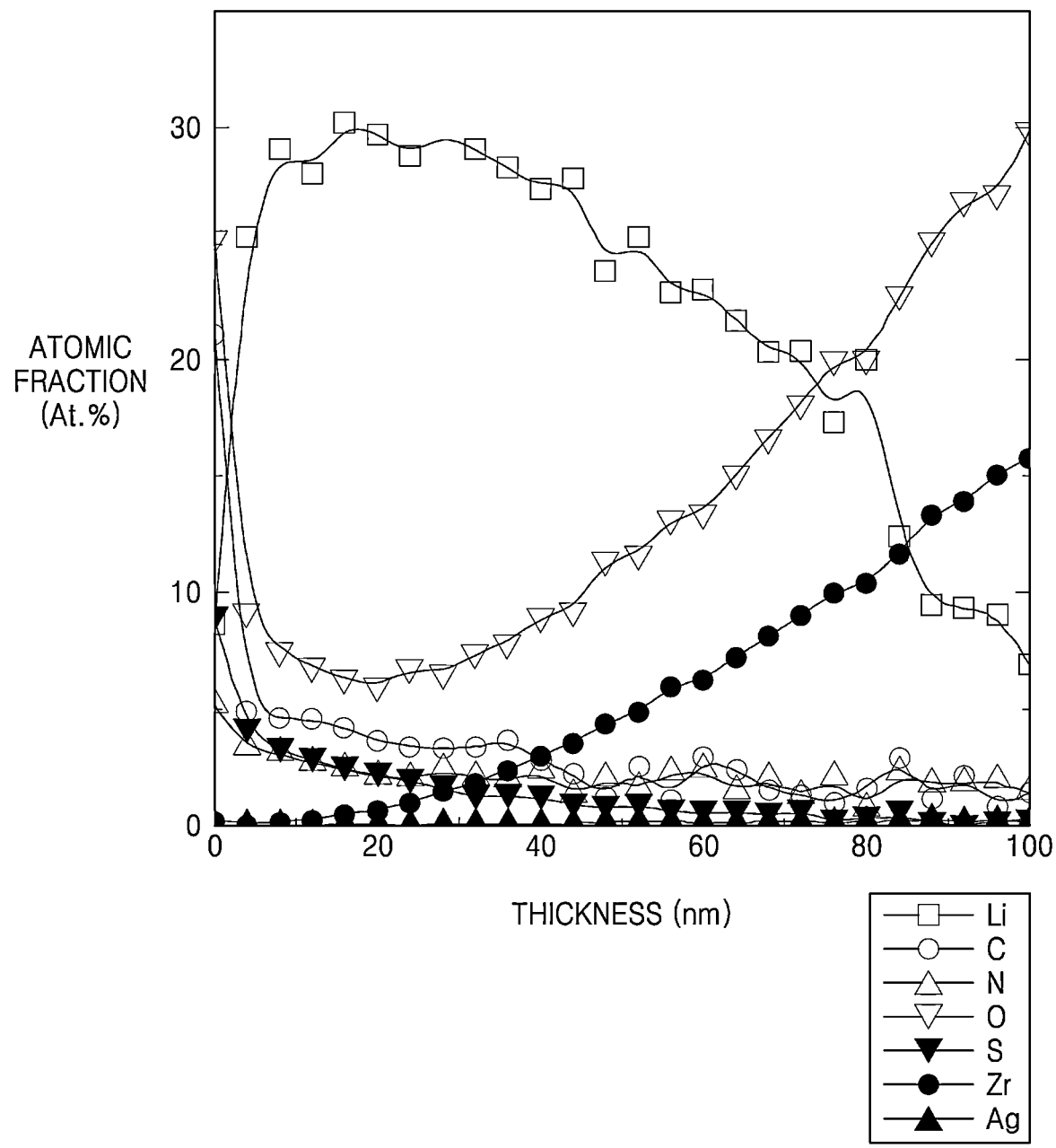
FIG. 4A is a graph of atomic content (atomic percent, At. %) versus thickness (nanometers, (nm)), illustrating the results of X-ray photoelectron spectroscopy (XPS) analysis of the composite solid electrolyte of Example 1.
Figure 4B:
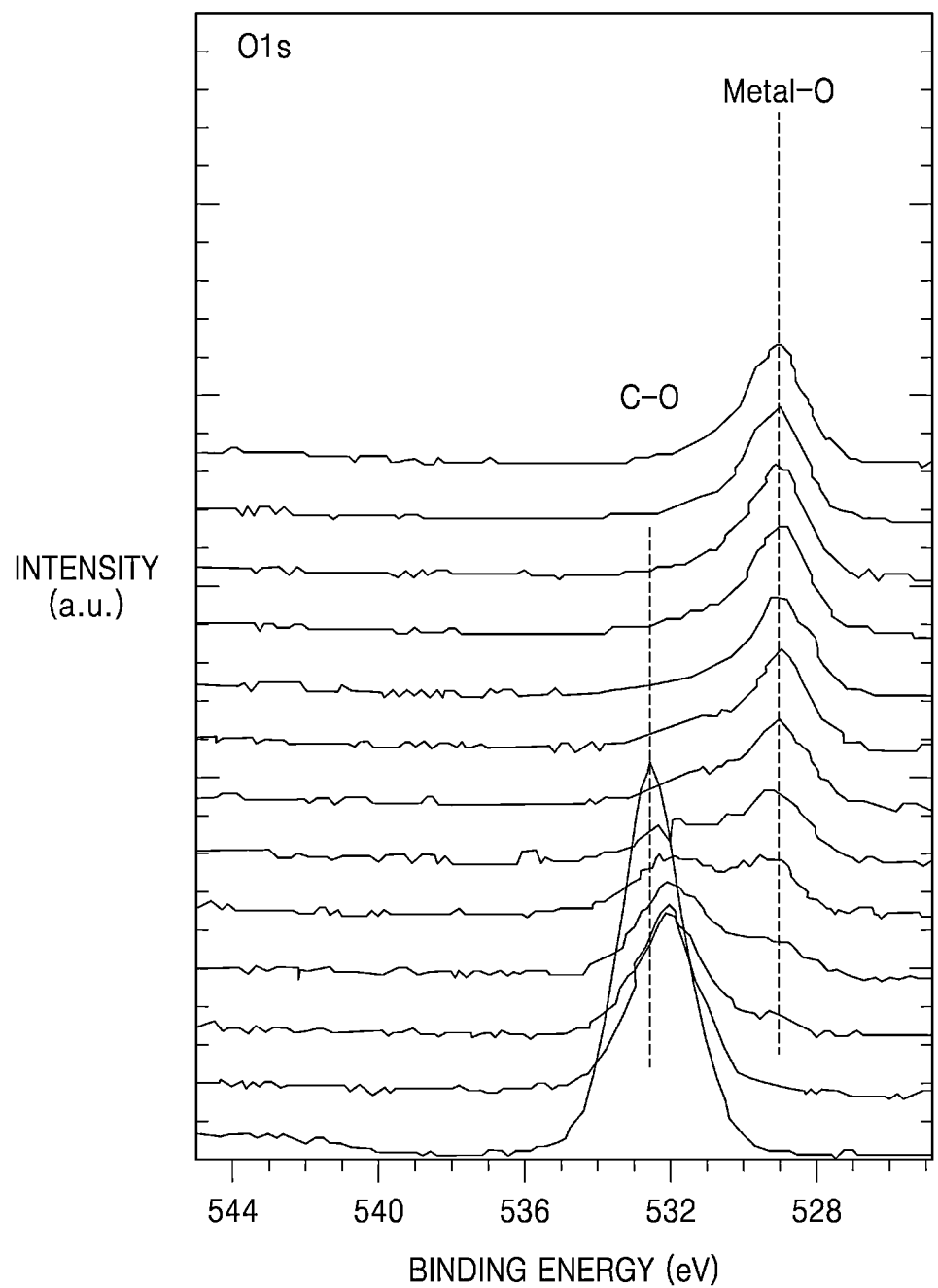
FIGS. 4B to 4D are graphs of intensity (arbitrary units, (a.u.)) versus binding energy (electron-volts (eV)) illustrating the results of XPS analysis of Example 1 for the elements O, Li, and Zr, respectively.
Figure 4C:
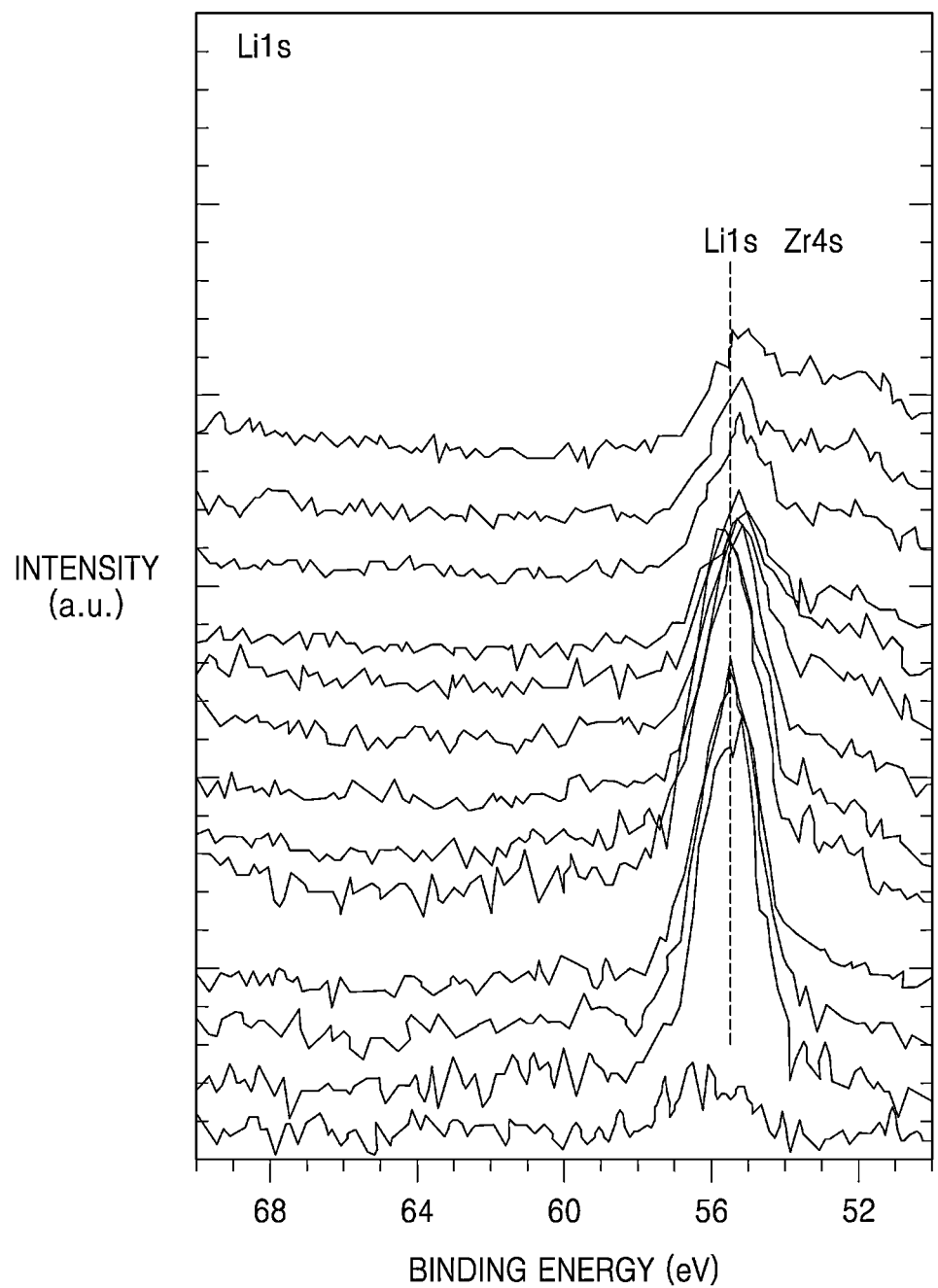
Figure 4D:
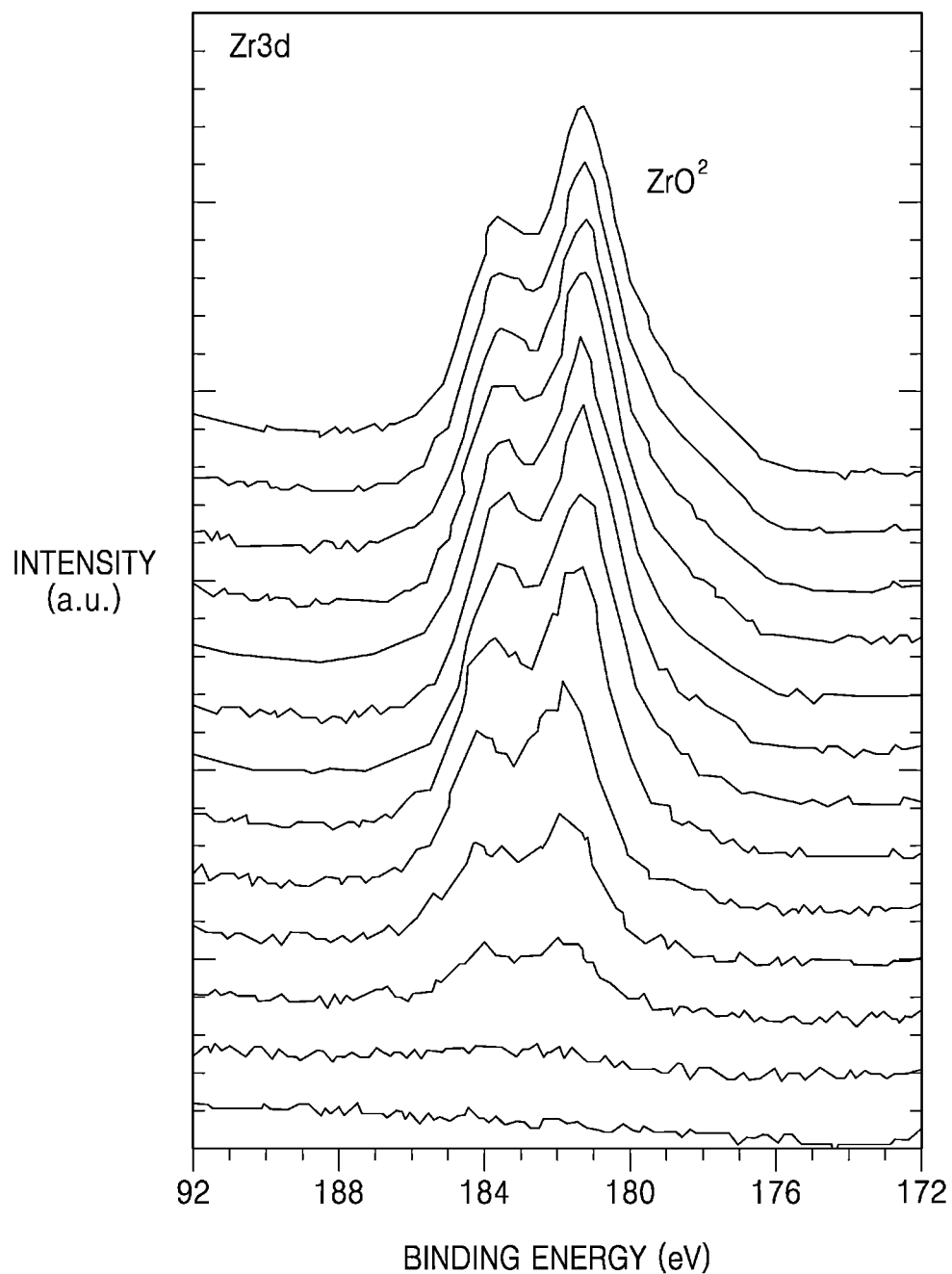

FIG. 3 is a schematic diagram illustrating a structure of an embodiment of a lithium-air battery.

Referring to FIG. 3, a lithium-air battery 500 has a structure in which an electrolyte layer 400 is interposed between a positive electrode 200 using oxygen as an active material and adjacent to a first current collector 210 and a negative electrode 300 including lithium and adjacent to a second current collector 310. The electrolyte layer 400 is a separator impregnated with a liquid electrolyte.

A composite solid electrolyte 450 may be disposed between the positive electrode 200 and the electrolyte layer 400. The first current collector 210 that is porous may also serve as a gas diffusion layer allowing diffusion of air. A pressing member 220 allowing air to reach the positive electrode 200 is located on the first current collector 210.

A case 320 formed of an insulating resin is disposed between the positive electrode 200 and the negative electrode 300 to electrically insulate the positive electrode 200 from the negative electrode 300. Air is supplied through an air inlet 230a and discharged through an air outlet 230b. The lithium-air battery 500 may be accommodated in a stainless steel case.

The term "air" of the lithium-air battery 500 is not limited to atmospheric air and may also refer to any suitable combination of gases, including oxygen or pure oxygen gas. This broad definition of "air" may also be applied to other aspects, such as air batteries and air electrodes.

Method of Preparing Composite Solid Electrolyte

A method of preparing a composite solid electrolyte according to an embodiment comprises: providing, e.g., preparing a solid electrolyte; disposing a first layer comprising a first element on the solid electrolyte, wherein the first element has a Gibbs reaction energy of greater than 0 electron-volts per mole;

heat-treating the first layer to oxidize the first element and form an oxide comprising the first element;

depositing a metal on the oxide to form a current collector;

contacting the oxide, the current collector, or a combination thereof with a liquid electrolyte comprising lithium; and applying a voltage to reduce the oxide to form a compound represented by Formula 2 to form a protective layer on the solid electrolyte and prepare the composite solid electrolyte

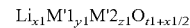

$$Li_{x1}M'1_{y1}M'2_{z1}O_{t1+x1/2}$$  Formula 2 wherein in Formula 2, M'1 is an element having a Gibbs reaction energy greater than 0 electron-volts per mole (eV/mol), M'2 is an element of Groups 2 to 14, $0<x1<1$, $0<y1<1$, $z1=0$, and $0<t1\leq1$.

(M'1) is arranged as a protective layer, by depositing the first element(M'1) on the solid electrolyte; preparing a first metal oxide composite solid electrolyte in which an oxide of the first element (e.g., $M'1_{y1}O_{t1}$, where y1 and t1 are each independently greater than 0 and equal to or less than 1) is arranged as a protective layer, by oxidizing the first element, which is on the solid electrolyte, in an air atmosphere or in an oxidizing atmosphere, by heat treatment; forming a current collector for plating by depositing a metal, e.g., silver, on the oxide comprising the first element; and preparing a composite solid electrolyte in which a compound represented by Formula 2 is provided as a protective layer on the solid electrolyte, by impregnating the oxide comprising the first element having the current collector for plating with a liquid electrolyte and doping lithium thereinto via an electrochemical reaction.

$$Li_{x1}M'1_{y1}M'2_{z1}O_{t1+x1/2}$$  Formula 2

Figure 9A:
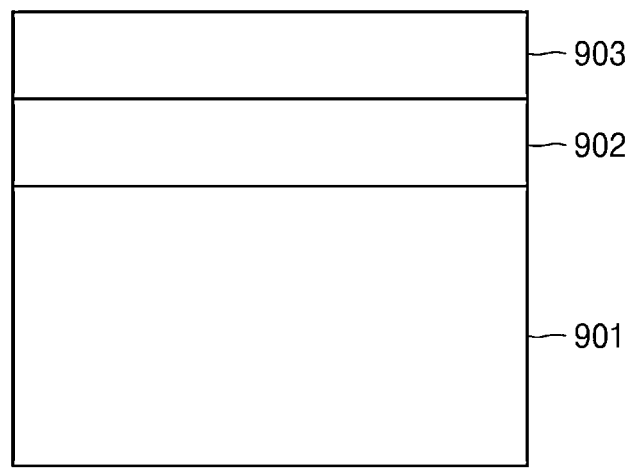
FIGS. 9A and 9B are schematic partial cross-sectional views of a solid electrolyte with first layer, and a solid electrolyte with a first layer and a second layer, respectively.

In Formula 2,

M1 is an element having a Gibbs reaction energy of reaction (ΔGr)) greater than 0 eV/mol, the Gibbs reaction energy of reaction obtained by subtracting a standard Gibbs energy of an anhydride of M'1 as a reactant and a standard Gibbs energy of water from a standard Gibbs energy of a hydroxide of M'1 as a product, when the hydroxide of M1' is produced via a reaction between the anhydride of M'1 and water, M'2 is an element of Groups 2 to 14, $0<x1<1$, $0<y1<1$, $z1=0$, and $0<t1\leq1$ In an aspect, the oxide of the first element is an oxide of the formula $M'1_{y1}O_{t1}$, where y1 and t1 are each independently greater than 0 and equal to or less than 1. The oxide may be provided as a protective layer by oxidizing the first element by heat-treating the first element in an oxidizing atmosphere, e.g., in an air atmosphere to form an oxide, disposing a current collector on the oxide, contacting the oxide with an electrolyte, and then applying a voltage to reduce the oxide to form the compound of Formula 2. The structure comprising the solid electrolyte 901, the first layer 902, and the current collector 903 is shown schematically in FIG. 9A.

According to the method of preparing a composite solid electrolyte, a lithium metal oxide protective layer in the form of a thin film is interposed between the positive electrode and the solid electrolyte, thereby providing a corrosion preventing layer at an interface between the positive electrode and the solid electrolyte. Thus, a composite solid electrolyte having excellent charging and discharging characteristics may be prepared.

The solid electrolyte may be the solid electrolyte.

Subsequently, the first element (M'1) may be deposited on the solid electrolyte to prepare the first oxide on the solid electrolyte in which a compound of the first element (M'1) is arranged as a protective layer.

The depositing may comprise any suitable deposition method, such as physical vapor deposition (PVD), chemical vapor deposition (CVD), or atomic layer deposition (ALD). An appropriate deposition method may be used, which may include sputtering.

M'1 may comprise Pt, Eu, Hf, Zr, Ta, Ti, Ce, Nb, W, Mo, Co, Tl, Si, Sb, Ag, V, Sn, Sc, Ni, Mn, Fe, Be, Cu, Ge, Al, Au, C, Tm, Dy, Pb, or a combination thereof.

For example, M'1 may include Pt, Eu, Hf, Zr, Ta, Ti, Ce, Nb, W, or a combination thereof. For example, M'1 may include Hf, Zr, Nb, or a combination thereof.

Subsequently, the first oxide, which is on the solid electrolyte, is oxidized in an air atmosphere or in an oxidizing atmosphere by heat-treatment to prepare the first oxide on the solid electrolyte. The first oxide may be an oxide of the first element (M'$1_{y1}$O$_{t1}$, where y1 and t1 are each independently greater than 0 and equal to or less than 1) is arranged as a protective layer.

The heat-treatment may be performed at a temperature of about 500° C. or higher in air or in an oxidizing atmosphere for about 1 hour or more, e.g., for about 2 hours or more, about 3 hours or more, or about 4 hours or more.

Subsequently, a metal such as silver, platinum, palladium, gold, nickel, copper, or a combination thereof is deposited on the first oxide to form a current collector. Silver is mentioned as the metal deposited on the first oxide to form a current collector.

Subsequently, the first oxide having the current collector is impregnated with the liquid electrolyte and reduced, e.g., doped with lithium, via an electrochemical reaction, e.g., reduction, to prepare a composite solid electrolyte in which the compound represented by Formula 2 is arranged as a protective layer. Silver deposited on the current collector for plating is naturally delaminated during the electrochemical reaction.

The electrochemical reaction may be performed using about 2 equivalents (eq.) to about 10 eq., about 3 eq. to about 8 eq., of electrons per 1 eq. of M1 for the reduction.

The protective layer may have a thickness of about 1 nm to about 1 μm, about 10 nm to about 100 μm, about 100 nm to about 10 μm, or about 500 nm to about 5 μm. In an aspect, the proactive layer has a thickness of about 1 nanometer (nm) to about 1 micrometer (μm). For example, the protective layer may have a thickness of about 1 nm to about 50 nm. When the protective layer has this thickness range, an electrochemical cell having excellent charge and discharge characteristics, with an ionic conductivity retention of about 80% or greater than the ion conductivity of the solid electrolyte without the protective layer, may be provided.

A method of preparing a composite solid electrolyte according to an embodiment comprises: providing, e.g., preparing a solid electrolyte; disposing a first layer on the solid electrolyte, wherein the first protective layer comprises a first metal composite;

disposing a first layer comprising a first element on the solid electrolyte, wherein the first element has a Gibbs reaction energy of greater than 0 electron-volts per mole;

disposing a second layer comprising a second element of Groups 2 to 14 on the solid electrolyte;

heat-treating the first layer and the second layer to form an oxide comprising the first element and the second element;

depositing a metal on the oxide to form a current collector;

contacting the oxide, the current collector, or a combination thereof with a liquid electrolyte comprising lithium; and applying a voltage to reduce the oxide to form a compound represented by Formula 3 to form a protective layer on the solid electrolyte and prepare the composite solid electrolyte $$Li_{x2}M''1_{y2}M''2_{z2}O_{t2+x2/2}$$ 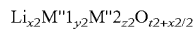 Formula 3 wherein in Formula 3,

M"1 is an element having a Gibbs reaction energy value of about 0 electron-volts per mole (eV/mol) or greater, M"2 is an element of Groups 2 to 14, $0<x2<1$, $0<y2<1$, $0<z2<1$, and $0<t2\leq 1$ The Gibbs reaction energy (ΔGr) may be obtained by subtracting a standard Gibbs energy of an anhydride of M"1 as a reactant and a standard Gibbs energy of water or water vapor from a standard Gibbs energy of a hydroxide of M"1 as a product, when the hydroxide of M"1 is produced via a reaction between the anhydride of M1 and water or water vapor.

According to the method of preparing a composite solid electrolyte, a lithium containing oxide protective layer in the form of thin film is disposed between the positive electrode and the solid electrolyte, thereby preventing corrosion at an interface between the positive electrode and the solid electrolyte. Thus, a composite solid electrolyte having excellent charging and discharging characteristics may be prepared.

The elements available as M"1 may be the same as those disclosed for M'1, and thus further description thereof will not be repeated.

M"2 may be an element of Groups 2 to 14. For example, M2 may be an element of Groups 2 to 8 or Groups 10 to 14. For example, M2 may be Ti, V, Cr, Mn, Fe, Ni, Cu, Zn, Ga, Ge, Si, Al, W, Cd, Pd, Sn, Pb, Sc, Mg, Ca, Sr, Ba, or a combination thereof.

Figure 9B:
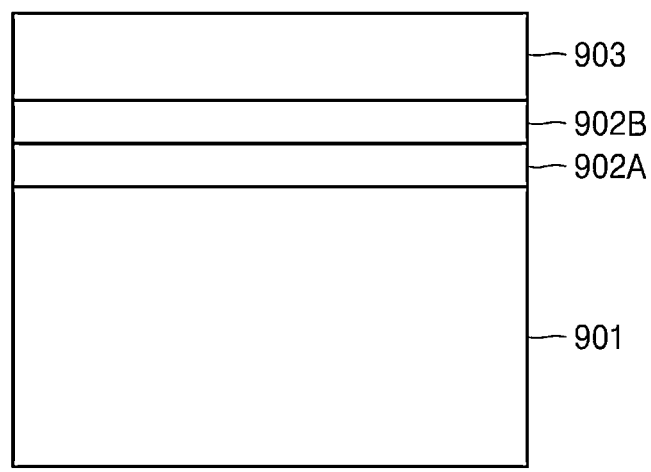

A structure comprising the solid electrolyte 901, the first layer 902A, the second layer 902B, and the current collector 903 is shown schematically in FIG. 9B.

A molar ratio of the deposited elements M"1 and M"2 may be in the range of about 0.1:10 to about 10:0.1.

A deposition method, temperature of heat-treatment, and thickness of the protective layer are as described herein, and thus descriptions thereof will not be repeated.

Hereinafter, an embodiment will be described in further detail with reference to the following examples and comparative examples. These examples and comparative examples are not intended to limit the purpose and scope of the disclosed embodiment.

EXAMPLES

Comparative Example 1: $Li_{1.3}Ti_{1.7}Al_{0.3}P_4O_{12}$ Solid Electrolyte

A solid electrolyte ($Li_{1.3}Ti_{1.7}Al_{0.3}P_4O_{12}$, hereinafter, referred to as "LATP") having a thickness of about 260 µm and a diameter of 19 millimeters (mm) was prepared.

Example 1: $Li_{0.67}Zr_{0.33}O$ Composite Solid Electrolyte

Zr was deposited on an upper surface of the LATP solid electrolyte having a thickness of about 260 µm and a diameter of 19 mm prepared according to Comparative Example 1 by sputtering to prepare a Zr metal composite solid electrolyte in which the Zr metal is arranged as a protective layer (thickness: 50 nm and diameter: 12 mm). The Zr metal composite solid electrolyte was oxidized by heat-treatment in an oxygen atmosphere at 500° C. for 4 hours to prepare a Zr metal oxide composite solid electrolyte in which $ZrO_2$ is arranged as a protective layer. Silver was deposited on an upper surface of the Zr metal oxide composite solid electrolyte to a thickness of 20 nm and a diameter of 11 mm to form a current collector for plating. The Zr metal oxide composite solid electrolyte having the current collector for plating was impregnated with a liquid electrolyte prepared by dissolving 1 M lithium bis(trifluoro methanesulfonyl)imide (LiTFSI, $LiN(SO_2CF_3)_2$) in a dimethoxy ether (DME) solvent by connecting an electric wire clip thereto and subjected to electrochemical reduction with 10 eq. of electrons per 1 eq. of Zr reduction, thereby preparing $Li_{0.67}Zr_{0.33}O$ ($Li_2ZrO_3$) composite solid electrolyte.

Example 2: $Li_{0.33}Nb_{0.33}O$ Composite Solid Electrolyte

A composite solid electrolyte ($Li_{0.33}Nb_{0.33}O$, $LiNbO_3$) was prepared in the same manner as in Example 1, except that an Nb metal oxide composite solid electrolyte in which Nb metal, instead of Zr metal, and $Nb_2O_3$, instead of $ZrO_2$, were arranged as protective layers was used and electrochemical reduction was performed with 10 eq. of electrons per 1 eq. of Nb reduction instead of 10 eq. of electrons per 1 eq. of Zr reduction.

Example 3: $Li_{0.08}Zr_{0.17}V_{0.0.25}O$ Composite Solid Electrolyte

V metal was deposited an upper surface of the Zr metal composite solid electrolyte prepared in Example 1 by sputtering for 10 minutes such that a molar ratio of Zr:V was 2:3 to prepare a Zr metal-V metal composite solid electrolyte in which the Zr metal and the V metal were arranged as a protective layer. The Zr metal-V metal composite solid electrolyte was oxidized by heat-treatment in an oxygen atmosphere at 500° C. for 4 hours to prepare a Zr metal-V metal oxide composite solid electrolyte in which $Zr_4V_6O_{23}$ was arranged as a protective layer. Silver was deposited on an upper surface of the Zr metal-V metal oxide composite solid electrolyte to a thickness of 20 nm and a diameter of 11 mm to form a current collector for plating. The Zr metal-V metal oxide composite solid electrolyte having the current collector for plating was impregnated with a liquid electrolyte prepared by dissolving 1 M lithium bis(trifluoro methanesulfonyl)imide (LiTFSI, $LiN(SO_2CF_3)_2$) in a DME solvent by connecting an electric wire clip thereto and subjected to electrochemical reduction with 10 eq. of electrons per 1 eq. of Zr reduction, thereby preparing $Li_{0.08}Zr_{0.17}V_{0.0.25}O$ ($LiZr_2V_3O_{12}$) composite solid electrolyte.

Example 4: $Li_{0.08}Zr_{0.17}Ta_{0.25}O$ Composite Solid Electrolyte

A composite solid electrolyte ($Li_{0.08}Zr_{0.17}Ta_{0.25}O$, $LiZr_2Ta_3O_{12}$) was prepared in the same manner as in Example 3, except that a Zr metal-Ta metal oxide composite solid electrolyte in which Ta metal, instead of V metal, and $Zr_4Ta_6O_{23}$, instead of $Zr_4V_6O_{23}$, were arranged as protective layers.

Example 5: $Li_{0.83}Zr_{0.17}Zn_{0.25}O$ Composite Solid Electrolyte

A composite solid electrolyte ($Li_{0.83}Zr_{0.17}Zn_{0.25}O$, $Li_{10}Zr_2Zn_3O_{12}$) was prepared in the same manner as in Example 3, except that a Zr metal-Zn metal oxide composite solid electrolyte in which Zn metal, instead of V metal, and $Zr_2Zn_3O_7$, instead of $Zr_4V_6O_{23}$, were arranged as protective layers was used and electrochemical reduction was performed with 10 eq. of electrons per 1 eq. of Zr reduction.

Example 6: $Li_{0.83}Zr_{0.17}Mg_{0.25}O$ Composite Solid Electrolyte

A composite solid electrolyte ($Li_{0.83}Zr_{0.17}Mg_{0.25}O$, $Li_{10}Zr_2Mg_3O_{12}$) was prepared in the same manner as in Example 3, except that a Zr metal-Mg metal oxide composite solid electrolyte in which Mg metal, instead of V metal, and $Zr_2Mg_3O_7$, instead of $Zr_4V_6O_{23}$, were arranged as protective layers was used and electrochemical reduction was performed with 10 eq. of electrons per 1 eq. of Zr reduction.

Comparative Example 2: Manufacture of Lithium-Air Battery

A positive electrode slurry was prepared by dissolving 1 g of polyvinyl butyral (Sigma Aldrich) in 9 g of ethanol and mixing the polyvinyl butyral solution with $LaRuO_3$ powder in a weight ratio of 3:7. Then, the positive electrode slurry was coated and rolled to obtain a positive electrode disc having a diameter of 12 mm. Subsequently, the positive electrode disc having a diameter of 12 mm was arranged on the solid electrolyte according to Comparative Example 1 and adhered thereto by heating at 350° C.

Separately, a copper current collector (having a thickness of 20 µm), a lithium foil (having a size of 1.4 cm×1.4 cm and a thickness of 100 µm), and a Celgard-3501 separator formed of a polypropylene material, having a thickness of 25 µm, and impregnated with an electrolyte solution, in which 1 M $LiN(SO_2CF_3)_2$(LiTFSI) and poly(ethyleneglycol)dimethylether (PEGDME) (Mw: 500) were mixed, were stacked and adhered to each other by heating in a vacuum to prepare a lithium negative electrode.

The solid electrolyte according to Comparative Example 1, to which the positive electrode disc was adhered to by heating, was arranged on the lithium negative electrode. Subsequently, a porous gas diffusion layer formed of carbon fiber was arranged on the positive electrode. A foamed nickel plate was arranged on the porous gas diffusion layer and pressed by a pressing member allowing air to reach the positive electrode to prepare a lithium-air battery.

Examples 7 to 12: Manufacture of Lithium-Air Battery

Lithium-air batteries were manufactured in the same manner as in Comparative Example 2, except that the composite solid electrolytes prepared according to Examples 1 to 6 were respectively used instead of the solid electrolyte of Comparative Example 1.

Analysis Example 1: SEM Image

Each of the lithium-air batteries according to Example 7 and Comparative Example 2 was installed in a 2 L oxygen chamber and an aqueous solution of calcium hydroxide, in which 100 mg of calcium hydroxide was dissolved in 10 mL of water, was added to a 20 mL vial and sealed for water supply. Then, the lithium-air battery was discharged with a constant current of 0.3 mA/cm² until a voltage reached 2.2 V (vs. Li) while maintaining the sealed vial at 40° C. and charged with the same current until the voltage reached 4.5 V, and then a cut-off voltage was set in the range of 2.2 V to 4.5 V while charging in a constant voltage (CV) mode to 0.01 mA/cm². In this regard, when a discharge voltage reached 2.2 V or less, the charging and discharging cycle was terminated.

After 12 cycles of charging and discharging of the lithium air batteries according to Example 7 and Comparative Example 2, the lithium-air batteries were disassembled and SEM images of the (composite) solid electrolytes, the positive electrodes, and the interfaces therebetween were obtained. The results are shown FIGS. 2A and 2B.

Figure 2A:
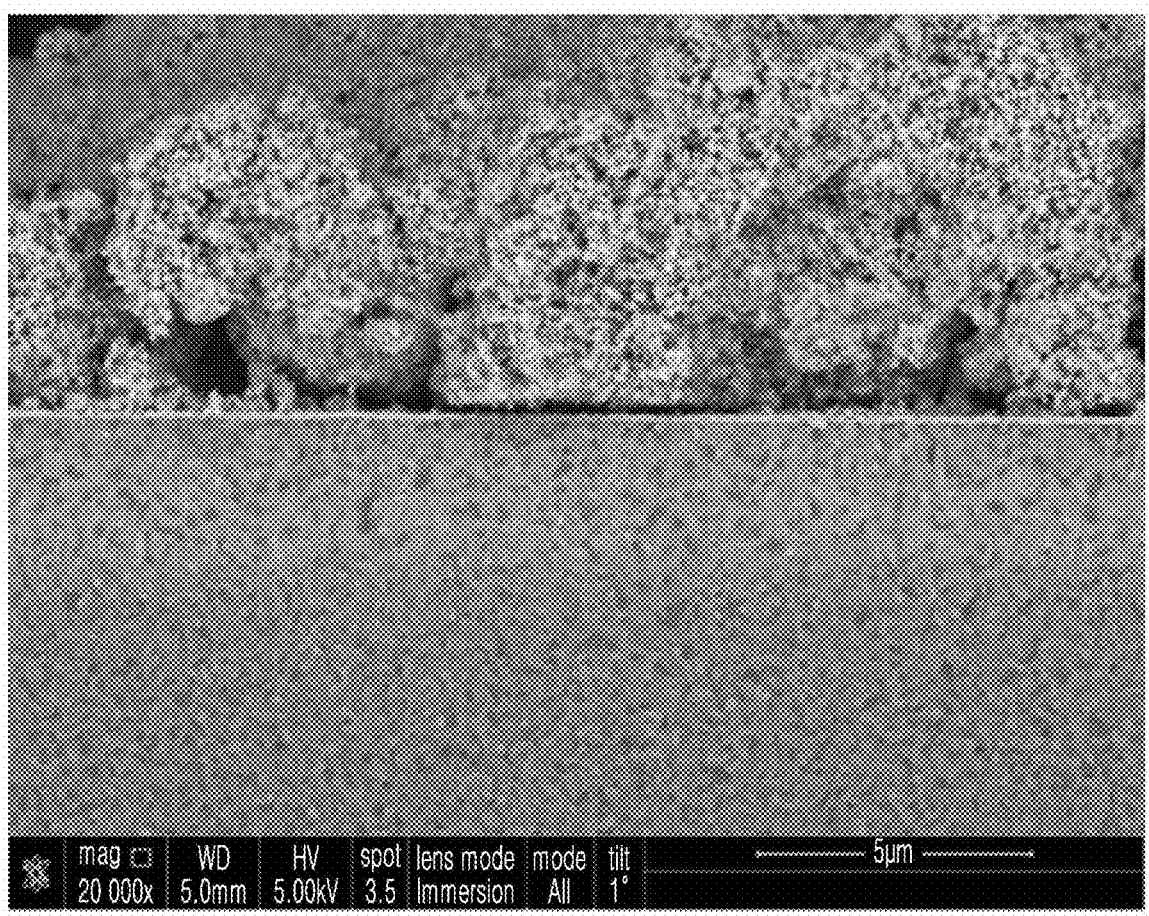
FIGS. 2A and 2B are scanning electron microscope (SEM) images of a disassembled lithium air battery according to Example 7 and Comparative Example 2, respectively, after performing charge and discharge cycles with a constant current of 0.3 mA/cm² between 2.2 V to 4.5 V, which include a (composite) solid electrolyte and a positive electrode.
Figure 2B:
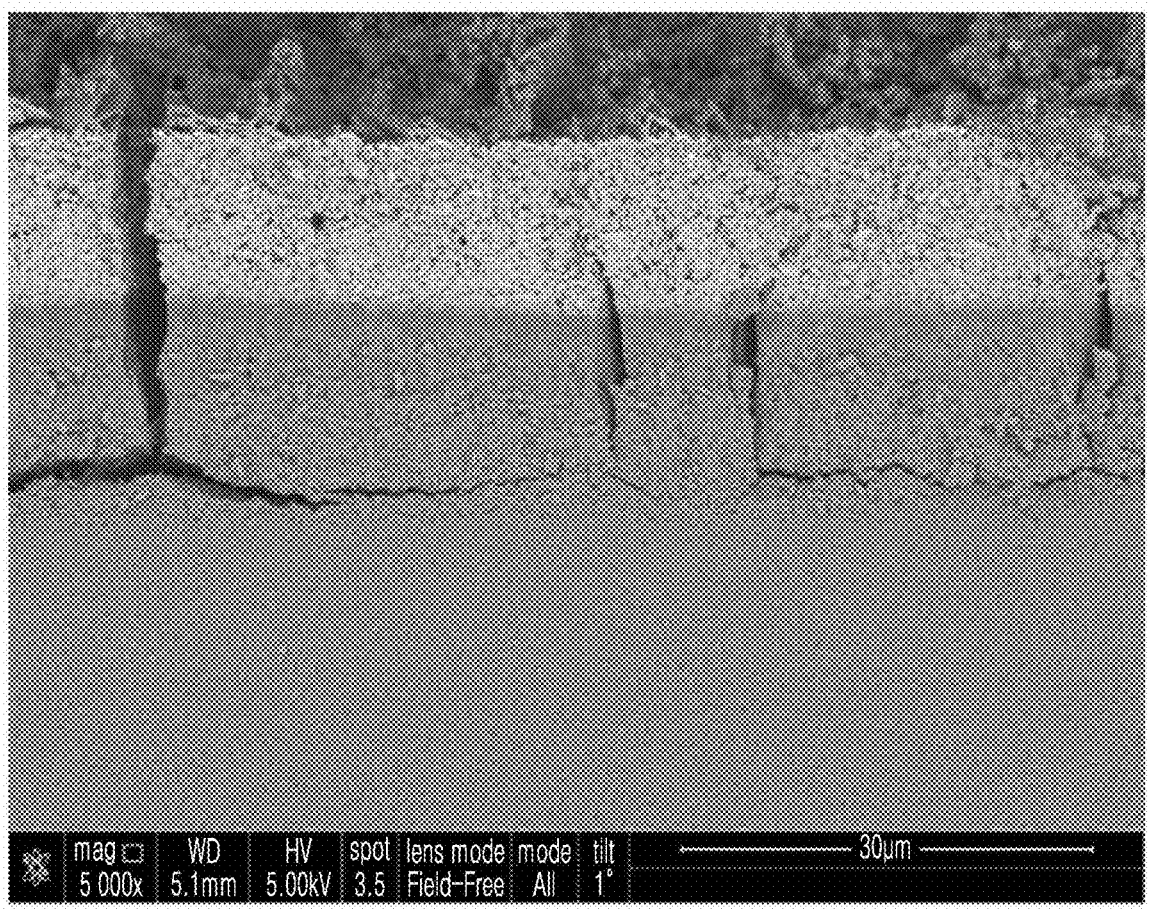

Referring to FIGS. 2A and 2B, it was confirmed that the surface of the composite solid electrolyte and the protective layer having a thickness of 50 nm facing the positive electrode were maintained in their shapes without cracks in the lithium-air battery of Example 7. In comparison, it was confirmed that the shape of the protective layer facing the positive electrode was not identified and also large cracks having a size of about 10 μm occurred at the interface between the solid electrolyte and the positive electrode in the lithium-air battery of Comparative Example 2.

Analysis Example 2: XPS Analysis

The composite solid electrolyte according to Example 1 was analyzed by X-ray photoelectron spectroscopy (XPS) in a depth direction. XPS analysis was performed by using a Quantera II XPS Scanning Microprobe (manufactured by Ulvac PHI), and analysis results are shown in FIGS. 4A to 4D.

Referring to FIGS. 4A to 4D, existence of components Li, Zr, and O was identified in the composite solid electrolyte according to Example 1 up to a depth of 100 nm.

Analysis Example 3: EDX Analysis

The lithium air batteries according to Example 7 and Comparative Example 2 were charged and discharged (10 cycles) under the same conditions as in Analysis Example 1 and disassembled to analyze chemical compositions of the surfaces of the positive electrodes. The results are shown in FIGS. 5A and 5B.

Figure 5A:
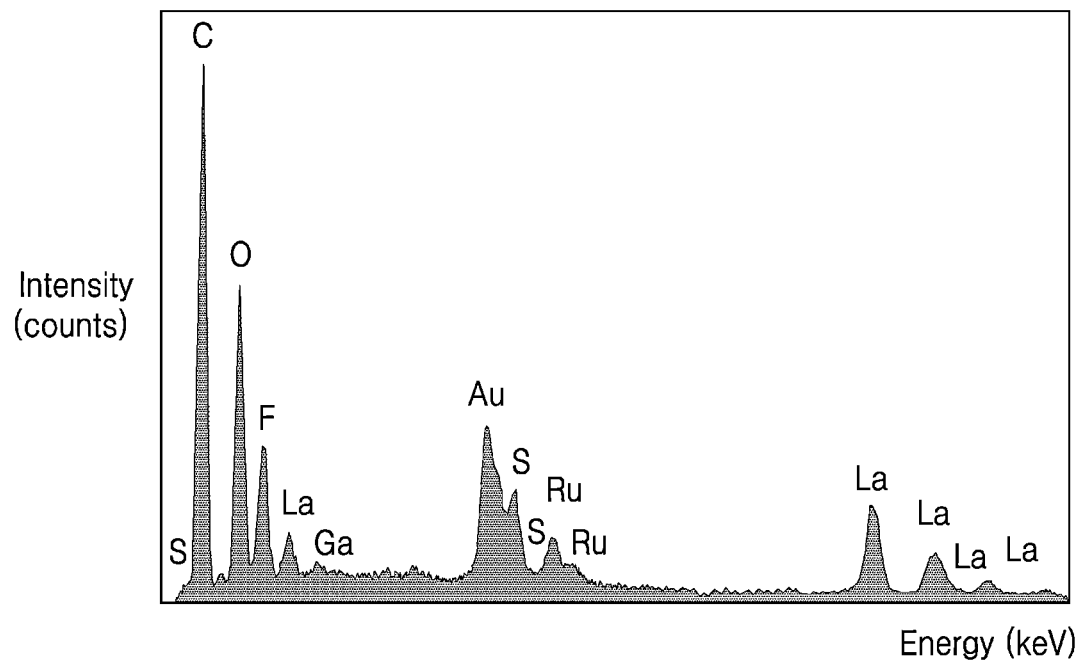
FIGS. 5A and 5B are each a graph of counts (number) versus energy (kiloelectron-volts, keV) showing the results of energy dispersive X-ray (EDX) analysis results of surfaces of positive electrodes from disassembled lithium air batteries according to Example 7 and Comparative Example 2, respectively, after performing charge and discharge cycles with a constant current of 0.3 milliamperes per square centimeter (mA/cm²) between 2.2 volts (V) and 4.5 V.
Figure 5B:
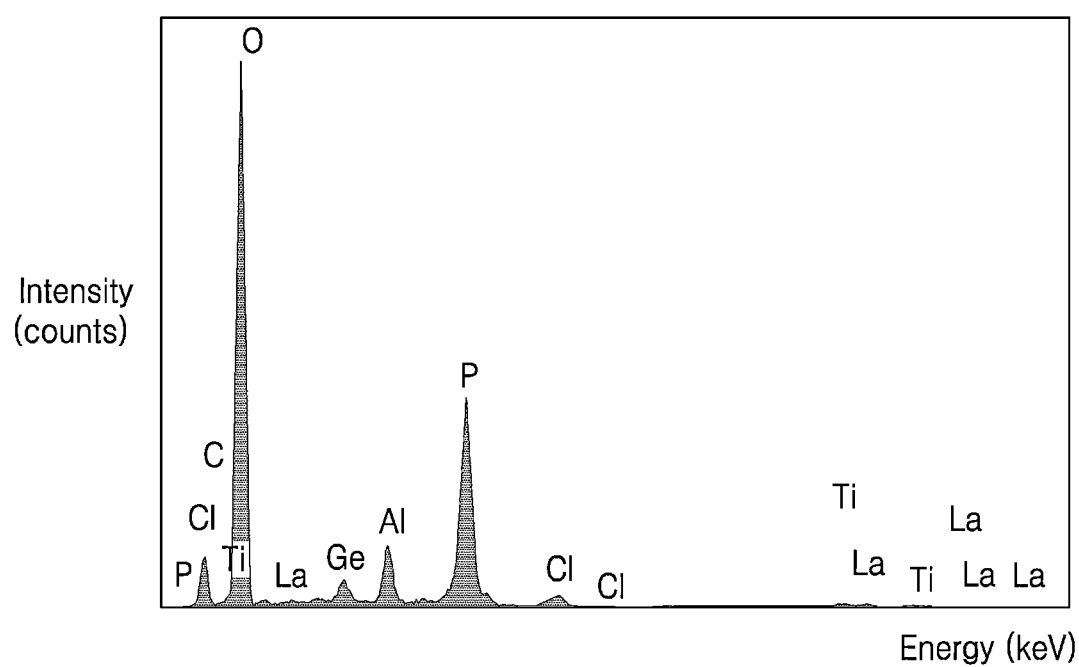

Referring to FIG. 5A, elution of the element P from the surface of the positive electrode of the lithium-air battery according to Example 7 was not observed. Referring to FIG. 5B, elution of the element P from the surface of the positive electrode of the lithium-air battery according to Comparative Example 2 was confirmed.

Based thereon, although elution of $PO_4^{3-}$ ions from the surface of the positive electrode of the lithium-air battery according to Comparative Example 2 was confirmed, no elution of $PO_4^{3-}$ ions from the surface of the positive electrode of the lithium-air battery according to Example 7 was confirmed.

Evaluation Example 1: Evaluation of Ionic Conductivity

A gold (Au) paste was deposited on upper and lower surfaces of pellets of the composite solid electrolyte of Example 1 and the solid electrolyte of Comparative Example 1 to form electrodes and heat-treated in the air at 700° C. for 1 hour. The samples on which the electrodes were formed were analyzed by measuring impedance of the samples using an impedance analyzer (Material Mates 7260 impedance analyzer) by a 2-probe method. A frequency of 0.1 Hertz (Hz) to 1 megaHertz (MHz) and an amplitude voltage of 100 mV were used. The measurement was performed in an air atmosphere at 20° C. Resistance was calculated from an arc of a Nyquist plot with respect to measurements of impedance and ionic conductivity was calculated therefrom. The results are shown in FIG. 6 and Table 1.

TABLE 1

| | Ionic conductivity (mS/cm, @ 20° C.) |
|---|---|
| Example 1 | $7.6 \times 10^{-5}$ |
| Comparative Example 2 | $9.0 \times 10^{-5}$ |

Figure 6:
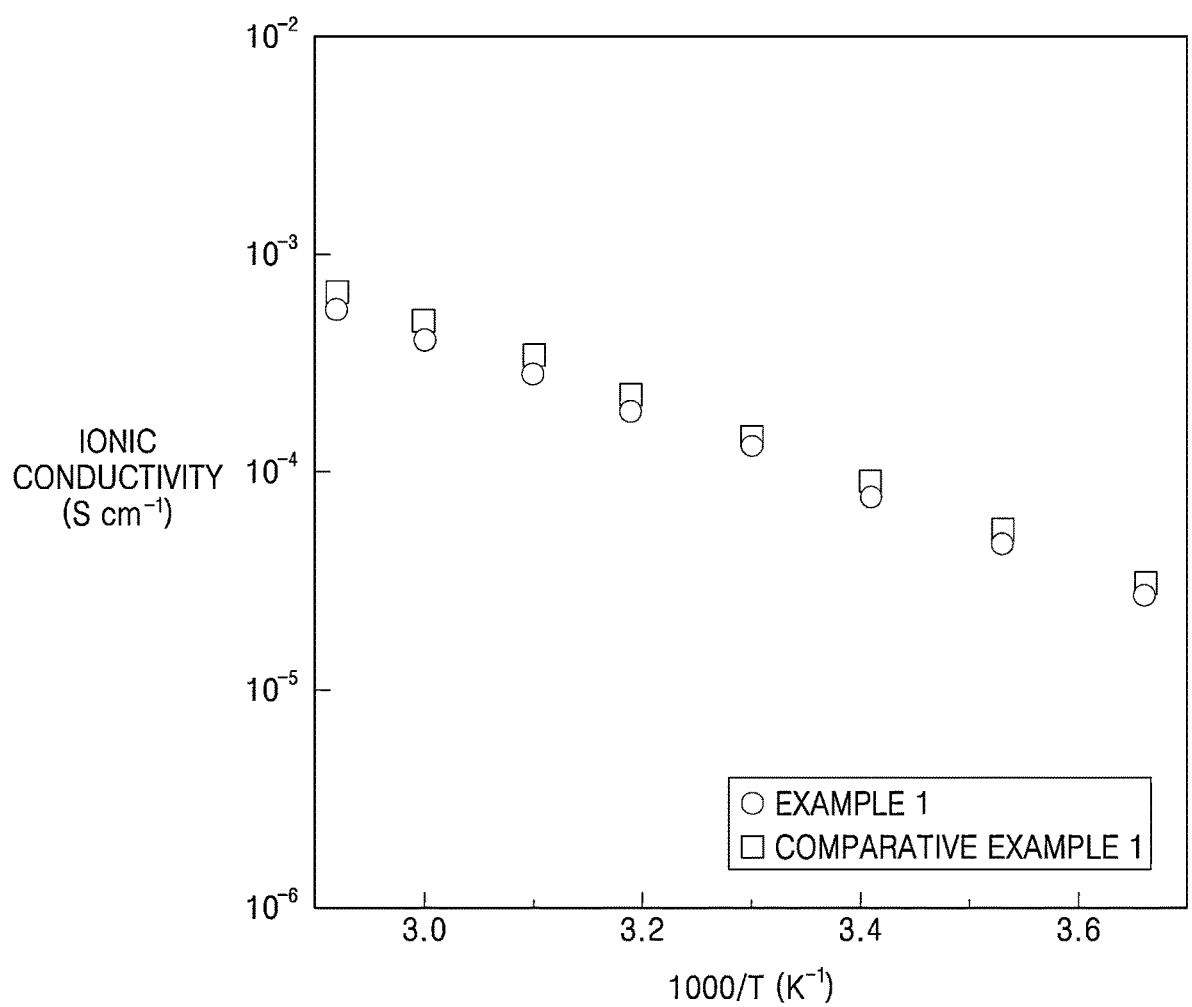
FIG. 6 is a graph of ionic conductivity (Siemens per centimeter (Scm⁻¹) versus the inverse of temperature (1000/T (1/Kelvin, K⁻¹)) illustrating the impedance a composite solid electrolyte according to Example 1 and a solid electrolyte according to Comparative Example 1, measured in air at 20° C.

Referring to FIG. 6 and Table 1, it may be confirmed that the ionic conductivity of the composite solid electrolyte according to Example 1 is 84% of the ionic conductivity of the solid electrolyte according to Comparative Example 1 at 20° C.

Evaluation Example 2: Evaluation of Charging and Discharging Characteristics

Evaluation Example 2-1: Evaluation of Electrochemical Stability

Each of the lithium air batteries according to Example 7 and Comparative Example 2 was installed in a 2 L oxygen chamber and an aqueous solution of calcium hydroxide, in which 100 mg of calcium hydroxide was dissolved in 10 mL of water, was added to a 20 mL vial and sealed for water supply. Then, the lithium-air battery was discharged with a constant current of 0.3 mA/cm² until a voltage reached 2.2 V (vs. Li) while maintaining the sealed vial at 40° C. and charged with the same current until the voltage reached 4.5 V, and then a cut-off voltage was set in the range of 2.2 V to 4.5 V while charging in a CV mode to 0.01 mA/cm². In this regard, electrochemical stability was evaluated by terminating the charge and discharge cycles when a discharge voltage reached 2.2 V or less. The results are shown in FIGS. 7A and 7B.

Figure 7A:
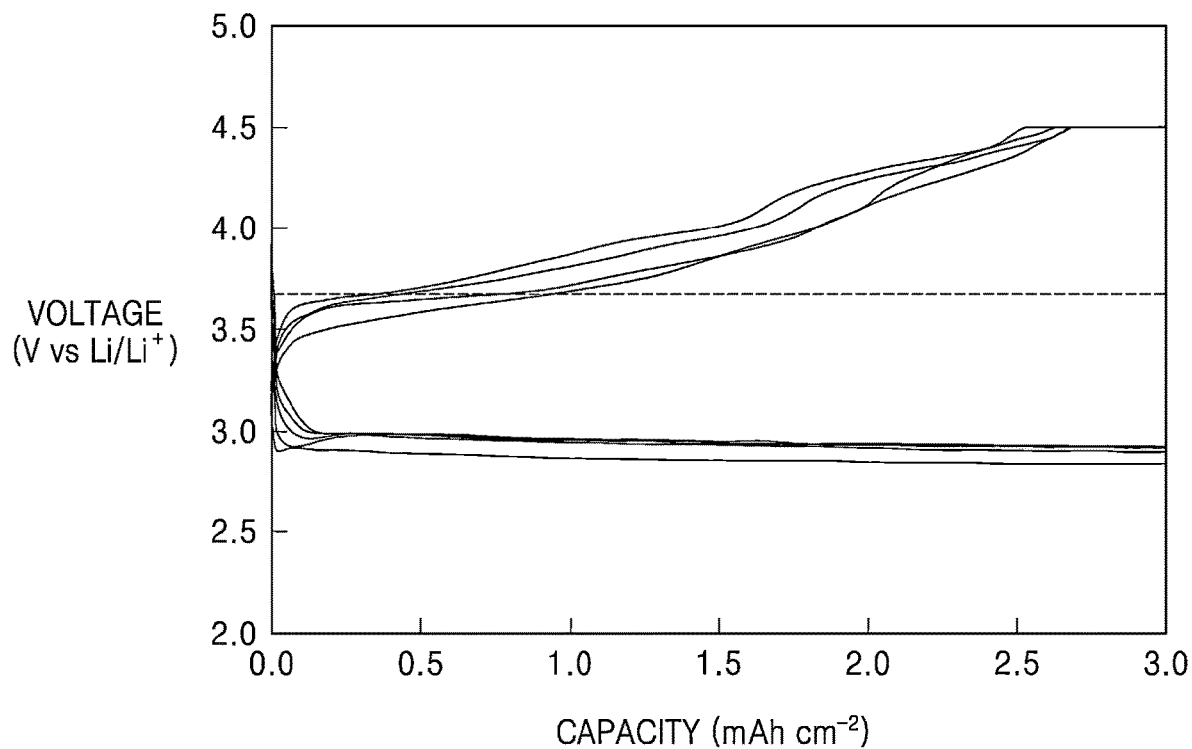
FIGS. 7A and 7B are graphs of voltage (volts (V) vs Li/Li⁺) versus capacity (milliampere hours per square centimeter (mAh·cm⁻²) showing the electrochemical stability of a lithium air battery according to Example 7 and Comparative Example 2, respectively, after performing charge and discharge cycles with a constant current of 0.3 milliamperes per square centimeter (mA/cm²) between 2.2 volts (V) and 4.5 V.
Figure 7B:
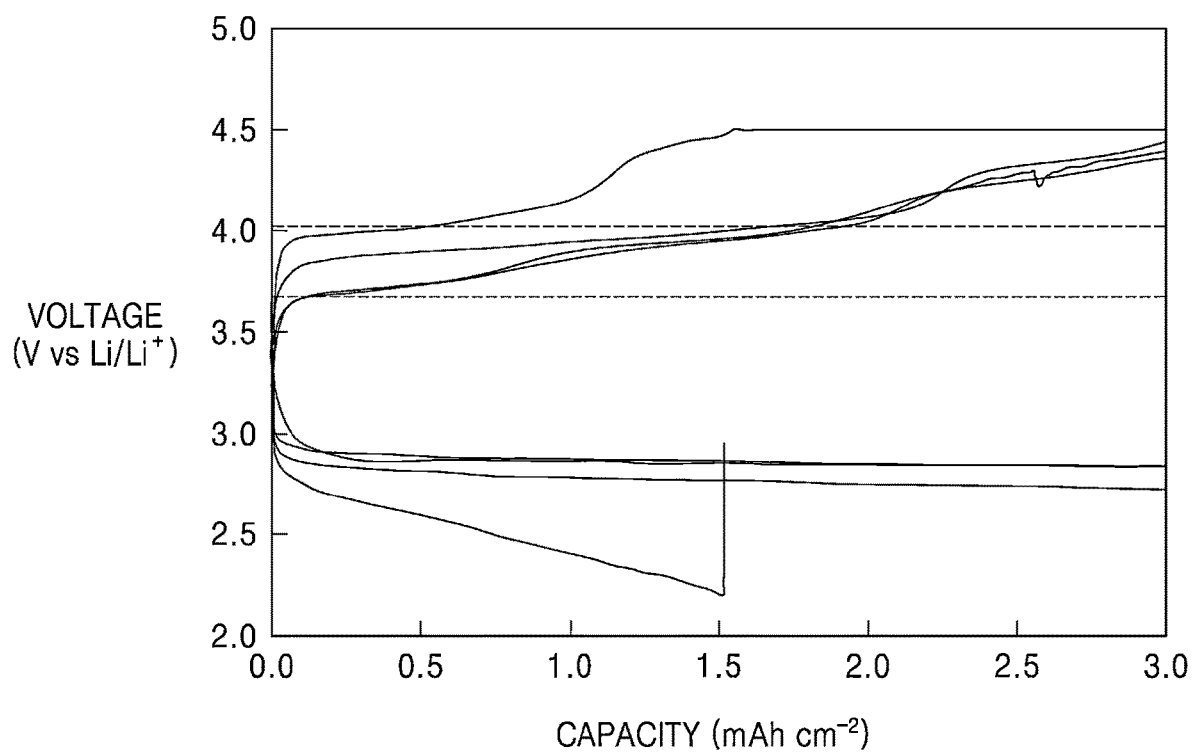

Referring to FIG. 7A, it was confirmed that the lithium-air battery of Example 7 stably operated during 14 cycles of charge and discharge. Referring to FIG. 7B, it was confirmed that the lithium-air battery according to Comparative Example 2 unstably operated due to overvoltage increased during 12 cycles of charge and discharge because $PO_4$ was released from the LATP solid electrolyte.

Evaluation Example 2-2: Evaluation of Lifespan Characteristics

Lifespan characteristics was evaluated by charging and discharging the batteries under the same charging and discharging conditions as in Evaluation Example 2-1. The results are shown in FIG. 8.

Figure 8:
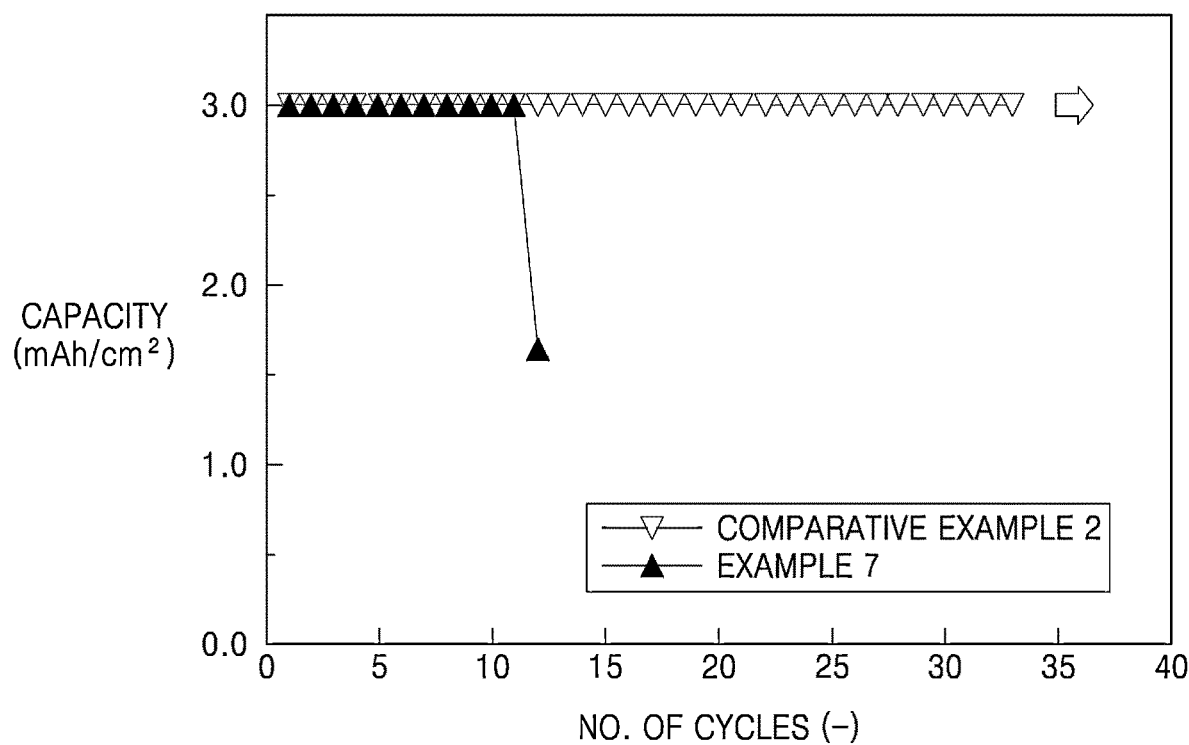
FIG. 8 is a graph of capacity (mAh/cm²) versus number of cycles illustrating lifespan characteristics of a lithium air battery according to Example 7 and Comparative Example 2, after performing charge and discharge cycles with a constant current of 0.3 mA/cm² between 2.2 V and 4.5 V

Referring to FIG. 8, while the capacity of the lithium-air battery according to Example 7 was maintained until 30 cycles or more of charging and discharging, the capacity of the lithium-air battery according to Comparative Example 2 rapidly decreased at the $12^{th}$ cycle of charging and discharging. Therefore, it may be confirmed that the lithium-air battery according to Example 7 had excellent lifespan characteristics when compared with the lithium-air battery according to Comparative Example 2.

Because the composite solid electrolyte according to an embodiment includes a metal oxide stable against a basic material in the protective layer, corrosion at the interface between the positive electrode and the composite solid electrolyte may be prevented in an electrochemical cell during charge and discharge in an environment containing moisture. The composite solid electrolyte may provide an electrochemical cell having excellent charge and discharge characteristics with an ionic conductivity remained at a level similar to that of the solid electrolyte without the protective layer.

It should be understood that embodiments described herein should be considered in a descriptive sense only and not for purposes of limitation. Descriptions of features, aspects, or advantages within each embodiment should be considered as available for other similar features, aspects, or advantages in other embodiments. While an embodiment has been described with reference to the figures, it will be understood by those of ordinary skill in the art that various changes in form and details may be made therein without departing from the spirit and scope as defined by the following claims.

What is claimed is:

1. A composite solid electrolyte comprising:
a solid electrolyte having a NASICON type crystal structure and including elements of Li, Ti, Al, P, and O; and
a protective layer, wherein the protective layer is on a surface of the solid electrolyte and comprises a compound represented by Formula 1

$$Li_xM1_yM2_zO_{t+x/2}$$ Formula 1 wherein in Formula 1,
M1 has a Gibbs reaction energy of greater than 0 electron-volts per mole,
M2 is Ti, V, Cr, Mn, Fe, Ni, Cu, Zn, Ga, Ge, Si, Al, W, Cd, Pd, Sn, Pb, Sc, Mg, Ca, Sr, Ba, or a combination thereof, $0<x<1$, $0<y<1$, $0<z<1$, and $0<t<1$, provided that when M1 is Nb and z is 0, the compound represented by Formula 1 is $Li_{0.33}Nb_{0.33}O$, and when M1 is Zr or Al, $z \neq 0$.

2. The composite solid electrolyte of claim 1, wherein M1 is an element having a Gibbs reaction energy value of about 0.3 electron-volts per mole or more.

3. The composite solid electrolyte of claim 1, wherein the Gibbs reaction energy of M1 is obtained by subtracting a standard Gibbs energy of an anhydride of M1 as a reactant and a standard Gibbs energy of water or water vapor from a standard Gibbs energy of a hydroxide of M1 as a product, when the hydroxide of M1 is produced via a reaction between the anhydride of M1 and water or water vapor.

4. The composite solid electrolyte of claim 1, wherein M1 is Pt, Eu, Hf, Zr, Ta, Ti, Ce, Nb, W, Mo, Co, Tl, Si, Sb, Ag, V, Sn, Sc, Ni, Mn, Fe, Be, Cu, Ge, Al, Au, C, Tm, Dy, Pb, or a combination thereof.

5. The composite solid electrolyte of claim 4, wherein M1 is Zr, Nb, V, Ta or a combination thereof.

6. The composite solid electrolyte of claim 1, wherein $z \neq 0$.

7. The composite solid electrolyte of claim 6, wherein M2 is Zn, Mg, V, or a combination thereof.

8. The composite solid electrolyte of claim 1, wherein the protective layer has a thickness of about 1 nanometer to about 200 micrometers.

9. The composite solid electrolyte of claim 8, wherein the protective layer has a thickness of about 1 nanometer to about 1 micrometer.

10. The composite solid electrolyte of claim 1, wherein the protective layer comprises $Li_{0.33}Nb_{0.33}O$, $Li_{0.08}Zr_{0.17}V_{0.25}O$, $Li_{0.08}Zr_{0.17}Ta_{0.25}O$, $Li_{0.83}Zr_{0.17}Zn_{0.25}O$, $Li_{0.83}Zr_{0.17}Mg_{0.25}O$, or a combination thereof.

11. The composite solid electrolyte of claim 1, wherein the solid electrolyte has a thickness of about 1 micrometer to about 1,000 micrometers.

12. The composite solid electrolyte of claim 1, wherein the composite solid electrolyte has an ionic conductivity of about 80% or greater than the ionic conductivity of a solid electrolyte without a protective layer at about 20° C.

13. A method of preparing a composite solid electrolyte, the method comprising:
providing a solid electrolyte having a NASICON type crystal structure and including elements of Li, Ti, Al, P, and O;
disposing a first layer comprising a first element on the solid electrolyte, wherein the first element has a Gibbs reaction energy of greater than 0 electron-volts per mole;
heat-treating the first layer to oxidize the first element and form an oxide comprising the first element;
depositing a metal on the oxide to form a current collector;
contacting the oxide, the current collector, or a combination thereof with a liquid electrolyte comprising lithium; and
applying a voltage to reduce the oxide to form a compound represented by Formula 1 to form a protective layer on the solid electrolyte and prepare the composite solid electrolyte of claim 1.

14. The method according to claim 13, wherein the oxide is represented by the formula $M'1_{y1}Ot1$, wherein y1 and t1 are each independently greater than 0 and equal to or less than 1, and M'1 is the first element.

15. The method according to claim 13, wherein the heat-treating comprises heat-treating in air.

16. The method of claim 13, wherein the heat-treating comprises heat-treating at a temperature of about 500 ° C. or greater for about 1 hour or more.

17. The method of claim 13, wherein the protective layer has a thickness of about 1 nanometer to about 1 micrometer.

18. The method of claim 13, wherein the metal deposited on the oxide to form the current collector is silver.

19. A method of preparing a composite solid electrolyte, the method comprising:
providing a solid electrolyte having a NASICON type crystal structure and including elements of Li, Ti, Al, P, and O;
disposing a first layer comprising a first element on the solid electrolyte, wherein the first element has a Gibbs reaction energy of greater than 0 electron-volts per mole;
disposing a second layer comprising a second element of Groups 2 to 14 on the solid electrolyte;
heat-treating the first layer and the second layer to form an oxide comprising the first element and the second element;
depositing a metal on the oxide to form a current collector;
contacting the oxide, the current collector, or a combination thereof with a liquid electrolyte comprising lithium; and
applying a voltage to reduce the oxide to form a compound represented by Formula 3-1 to form a protective layer on the solid electrolyte and prepare the composite solid electrolyte of claim 1.

20. The method of claim 19, wherein the first layer is deposited before the second layer.

21. The method of claim 19, wherein the second layer is deposited before the first layer.

22. The method of claim 19, wherein the first layer is between the solid electrolyte and the second layer.

23. The method of claim 19, wherein the second layer is between the solid electrolyte and the first layer.

24. The method of claim 19, wherein the oxide is represented by the formula $M''1_{y2}M''2_{z2}O_{t2}$, and
wherein
M''1 is the first element;
M''2 is the second element; and
y2, z2, and t2 are each independently greater than 0 and equal to or less than 1.

25. The method of claim 19, wherein the heat-treating comprises heat-treating in air.

26. The method of claim 19, wherein the heat-treating comprises heat-treating at a temperature of about 500° C. or more for about 1 hour or longer.

27. The method of claim 19, wherein the protective layer has a thickness of about 1 nanometer to 1 micrometer.

28. The method of claim 19, wherein the metal deposited on the oxide to form the current collector is silver.

29. An electrochemical cell comprising:
a negative electrode;
an electrolyte comprising a composite solid electrolyte; and
a positive electrode having a NASICON type crystal structure and including elements of Li, Ti, Al, P, and O, wherein the composite solid electrolyte comprises a solid electrolyte, and a protective layer, wherein the protective layer is on a surface of the solid electrolyte and comprises a compound represented by Formula 1

$$Li_xM1_yM2_zO_{t+x/2}$$  Formula 1 wherein in Formula 1,
M1 has a Gibbs reaction energy of greater than 0 electron-volts per mole,
M2 is Ti, V, Cr, Mn, Fe, Ni, Cu, Zn, Ga, Ge, Si, Al, W, Cd, Pd, Sn, Pb, Sc, Mg, Ca, Sr, Ba, or a combination thereof,
$0<x<1$, $0<y<1$, $0<z<1$, and $0<t<1$,
provided that when M1 is Nb and z is 0, the compound represented by Formula 1 is $Li_{0.33}Nb_{0.33}O$ and when M1 is Zr or Al, z 0, and
wherein the protective layer of the composite solid electrolyte is between the solid electrolyte and the positive electrode.

30. The electrochemical cell of claim 29, wherein the negative electrode comprises lithium metal or a lithium alloy.

31. The electrochemical cell of claim 29 wherein the composite solid electrolyte is crack-free.

32. The electrochemical cell of claim 31, wherein the composite solid electrode is crack-free in the presence of LiOH.

33. The electrochemical cell of claim 29, wherein the composite solid electrolyte is crack-free at an interface with the positive electrode at an operating voltage of about 2 volts to about 4.5 volts vs Li/Li+.

34. The electrochemical cell of claim 29, wherein the positive electrode is configured to use oxygen or water as a positive active material.

35. The electrochemical cell of claim 29, wherein the electrolyte further comprises a liquid electrolyte, a gel electrolyte, a polymeric ionic liquid, or a combination thereof.

36. The electrochemical cell of claim 35, wherein the liquid electrolyte comprises LiSCN, $LiN(CN)_2$, $Li(CF_3SO_2)_3$ C, $LiC_4F_9SO_3$, $LiN(SO_2CF_2CF_3)_2$, LiCl, LiF, LiBr, LiI, $LiB(C_2O_4)_2$, $LiBF_4$, $LiBF_3(C_2F_5)$, lithium bis (oxalato) borate, lithium oxalyldifluoroborate, lithium difluoro(oxalato)borate, lithium bis(trifluoro methanesulfonyl) imide, lithium bis(fluorosulfonyl)imide , $LiCF_3SO_3$, $LiAsF_6$, $LiSbF_6$, $LiClO_4$, or a combination thereof.

37. The electrochemical cell of claim 35, wherein the liquid electrolyte comprises an organic solvent, an ionic liquid, an oligomer, or a combination thereof.

* * * * *